United States Patent
Wang et al.

(10) Patent No.: US 12,451,984 B2
(45) Date of Patent: Oct. 21, 2025

(54) 6G PERVASIVE CHANNEL MODELING METHOD SUITABLE FOR ALL FREQUENCY BANDS AND ALL SCENARIOS

(71) Applicants: Southeast University, Nanjing (CN); PURPLE MOUNTAIN LABORATORIES, Nanjing (CN)

(72) Inventors: Chengxiang Wang, Nanjing (CN); Zhen Lv, Nanjing (CN)

(73) Assignees: Southeast University, Nanjing (CN); PURPLE MOUNTAIN LABORATORIES, Nanjing (CN)

( * ) Notice: Subject to any disclaimer, the term of this patent is extended or adjusted under 35 U.S.C. 154(b) by 0 days.

(21) Appl. No.: 18/696,233

(22) PCT Filed: Mar. 19, 2023

(86) PCT No.: PCT/CN2023/082380
§ 371 (c)(1),
(2) Date: Mar. 27, 2024

(87) PCT Pub. No.: WO2023/169590
PCT Pub. Date: Sep. 14, 2023

(65) Prior Publication Data
US 2024/0297724 A1    Sep. 5, 2024

(51) Int. Cl.
*H04B 17/391* (2015.01)
(52) U.S. Cl.
CPC ............................... *H04B 17/3911* (2015.01)
(58) Field of Classification Search
CPC ............ H04B 17/3911; H04B 7/0626; H04B 7/0617; H04B 7/0452; H04B 7/06952;
(Continued)

(56) References Cited

U.S. PATENT DOCUMENTS

2003/0050020 A1*  3/2003  Erceg ...................... H04B 7/04
                                                  455/101
2012/0183093 A1*  7/2012  Zhu ........................ H04B 7/0639
                                                  375/285

FOREIGN PATENT DOCUMENTS

| CN | 105553584 A | 5/2016 |
| CN | 107425895 A | 12/2017 |
| CN | 114598408 A | 6/2022 |

OTHER PUBLICATIONS

Bian, Ji et al., A General 3D Non-Stationary Wireless Channel Model for 5G and Beyond, IEEE Transactions on Wireless Communications, vol. 20, No. 5, May 2021, 14 pgs.
(Continued)

*Primary Examiner* — Fred A Casca
(74) *Attorney, Agent, or Firm* — JC ONE WORLD

(57) ABSTRACT

A 6G pervasive channel modeling method includes the following steps: S1, setting a propagation scenario and a propagation condition, and determining a carrier frequency, an antenna type, a layout of a transmitting end and a receiving end, and the like; S2, generating large-scale fadings such as path loss, shadowing and blocking effect loss; S3, generating large-scale parameters having spatial consistency; S4, generating scatterer positions in ellipsoid Gaussian scattering distribution, and calculating a delay, an angle and a power of a cluster according to the positions of the transmitting end, the receiving end and the scatterers to generate a channel coefficient, and S5, on the basis of movements of the transmitting end and the receiving end and a birth-death process of each cluster, updating the large scale parameters and small-scale parameters, and generating a new channel coefficient.

9 Claims, 2 Drawing Sheets

(58) Field of Classification Search
CPC ...... H04B 17/391; H04B 7/0695; H04B 7/10; H04B 7/0426; H04W 68/02; Y02D 30/70; H01W 72/541
See application file for complete search history.

(56) References Cited

OTHER PUBLICATIONS

Zheng, Yi et al., A General 3D Non-Stationary Massive MIMO GBSM for 6G Communication Systems, 2021 IEEE Wireless Communications and Networking Conference (WCNC), 6 pgs.
Wang, Cheng-Xiang et al., Pervasive Wireless Channel Modeling Theory and Applications to 6G GBSMs for All Frequency Bands and All Scenarios, IEEE Transactions on Vehicular Technology, May 2022, 15 pgs.
Wang Chengxiang et al., 6G oriented wireless communication channel characteristics analysis and modeling, Chinese Journal on Internet of Things, Mar. 2020, vol. 4 No. 1, 14 pgs.

\* cited by examiner

6G PERVASIVE CHANNEL MODELING METHOD SUITABLE FOR ALL FREQUENCY BANDS AND ALL SCENARIOS

TECHNICAL FIELD

The present disclosure relates to a method for pervasively modeling 6G channels for all frequency bands and all scenarios, which belongs to the technical field of wireless communication.

BACKGROUND

As illustrated in FIG. 2 below, 6G wireless channels can be summarized as all spectra (sub-6 GHz/millimeter wave (mmWave)/terahertz (THz)/optical wireless frequency bands), global-coverage scenarios (space-air-ground-sea integration, including the communication channels of satellite, unmanned aerial vehicle (UAV), terrestrial and maritime) and full-application scenarios (such as vehicle-to-vehicle (V2V), high-speed train (HST) channels, (ultra-) massive multiple-input multiple-output (MIMO), reconfigurable intelligent surfaces (RIS), industrial Internet of things (IIoT)) channels. At the same time, the 6G channels suitable for all frequency bands and all scenarios also exhibit multitudinous new channel characteristics, which brings new challenges to the 6G channel modeling.

In terms of the all spectra, due to the application of high frequency bands such as mmWave and THz, wireless channels exhibit the characteristics such as wide bandwidth, frequency non-stationarity, diffuse scattering, large path loss, blockage effects and atmosphere absorption. In the visible light communication (VLC) band, the channels will no longer have small-scale fading, and exhibit negligible Doppler effect and frequency non-stationarity. In terms of global-coverage scenarios, in addition to the terrestrial mobile communication scenario, satellite communication, UAV communication and maritime communication scenarios are also included. In the satellite communication channels, the Doppler shift caused by the rapid movement of satellites, the rain attenuation and the ionospheric effect should be taken into account. In the UAV communication system, the arbitrary three-dimensional (3D) trajectories of UAV and altitudes-dependent large-scale parameters should be mainly considered. In terms of the full-application scenarios, the V2V channels exhibit Doppler shift and time-domain non-stationary characteristics due to the multiple mobility of the transceiver and the clusters. At higher moving speeds of more than 500 km/h, the channel experiences stronger Doppler shifts and more pronounced time-domain non-stationarity. In the scenario of ultra-high speed train (UHST) running in vacuum tube, the influence of vacuum tube waveguide effect should also be considered. The ultra-massive MIMO channel exhibits spherical wavefront and spatial non-stationary characteristics. Ultra-dense scatterer distribution and multiple mobility need to be considered in IIoT channels. In addition, the precise modeling for wireless channels utilizing RIS technology also needs to be studied.

Considering that the mixed application of various new technologies will bring about the combination of different channel characteristics, an important challenge of modeling 6G channels is how the various channel characteristics be considered comprehensively and to propose a pervasive channel model suitable for all frequency bands and all scenarios. For example, when mm Wave/THz band and massive MIMO technology are applied at the same time in high-speed moving scenarios, wireless channels will exhibit spatial-time-frequency non-stationary characteristics, spatial consistency (that is, in multi-user scenarios, channel coefficients of neighborhood users are correlated or different trajectory points of a single user are spatially correlated), and multi-band correlation.

To sum up, it is urgent to establish an accurate, pervasive, and flexible 6G channel model. The problems are tried to be solved in standard 5G channel models such as B5GCM, 3GPP TR 38.901, IMT-2020 and QuaDRiGa, but all of them cannot accurately and comprehensively describe all of the above-mentioned characteristics. In terms of the all spectra, these models do not apply to the VLC band, and ignore some characteristics of the mmWave/THz band. For example, QuaDRiGa neglects to model the atmospheric absorption and blockage effects, and 3GPP TR 38.901 and IMT-2020 neglects the frequency non-stationary characteristics of high frequency bands. In terms of all coverage, these channel models are aimed at land mobile communication channels, and cannot be applied to the scenarios of satellite, UAV and maritime communication. In terms of full application, they do not support modeling for HST, UHST, RIS, and IIoT channels, and the spherical wavefront and spatial non-stationary properties of (ultra-)massive MIMO are not taken into consideration in 3GPP TR 38.901 and IMT-2020. In summary, these models still lack pervasiveness and do not take all the channel characteristics mentioned above into consideration. In order to fill the research gap, the pervasive channel modeling theory is proposed and applied to the geometric random channel model, and a modeling method for 6G pervasive channels suitable for all frequency bands and all scenarios is proposed and disclosed.

SUMMARY

Technical problems: the objectives of the present disclosure are to provide a method for pervasively modeling 6G channels for all spectra (sub-6 GHz/mmWave/THz/optical wireless frequency bands), global-coverage scenarios (space-air-ground-sea integration, including the communication channels of satellites, UAV, terrestrial and maritime) and full-application scenarios (such as V2V, HST, UHST, (ultra-)massive MIMO, RIS, IIoT scenarios).

Technical solutions: the present disclosure provides a method for pervasively modeling 6G channels for all frequency bands and all scenarios. Massive uniform linear arrays are adopted at both a transmitter side and a receiver side in a 6G pervasive geometry-based stochastic channel model named 6G pervasive channel model (6GPCM), and the model is a multi-bounce propagation model, where $A_p^T$ denotes a p-th array element of a transmitter antenna array, $A_q^R$ denotes a q-th array element of a receiver antenna array, and a distance between the transmitter antenna array and the receiver antenna array is $\delta_T(\delta_R)$; $\beta_A^{T(R)}$ denotes an azimuth angle of the transmitter antenna array and the receiver antenna array in an xy plane, and $\beta_E^{T(R)}$ denotes an elevation angle of the transmitter antenna array and the receiver antenna array; for a n-th propagation path from $A_p^T$ to $A_q^R$, n=1, 2, 3, . . . , $N_{qp}(t)$, where $C_n^A$ denotes a first-bounce cluster of the n-th path proximity to the transmitter side, $C_n^Z$ denotes a last-bounce cluster proximity to the receiver side, and a propagation path between the two clusters is modeled as a virtual link; when a delay of the virtual link between the first-bounce cluster and the last-bounce cluster is zero, the model is reduced to a single-bounce model; besides, $N_{qp}(t)$ is the number of paths from $A_p^T$ to $A_q^R$ at a time instant/corresponding to $N_{qp}(t)$ cluster pairs in a double-cluster model with the first-bounce cluster and the last-bounce cluster in one-to-one correspondence with each other, and corresponding to $N_{qp}(t)$ clusters in a single-cluster model; on a microscopic level, analyzing clusters $C_n^A$ and $C_n^Z$ on the n-th path, and $M_n(t)$ scatterers are existed in the clusters, $C_{m_n}^A$ denotes an m-th scatterer in $C_n^A$, $C_{m_n}^Z$ denotes an m-th scatterer in $C_n^Z$; from a view point of the path, $C_{m_n}^A$, is understood as a scatterer connected by an m-th sub-path from $A_p^T$ to $C_n^A$, and $C_{m_n}^Z$ is understood as a scatterer connected by an m-th sub-path from $A_q^R$ to $C_n^Z$; besides, $\phi_{A,m_n}^T(t)$ and $\phi_{E,m_n}^T(t)$ denote an azimuth departure angle and an elevation departure angle corresponding to an m-th sub-path from $A_1^T$ to $C_n^A$ at the time instant t, $\phi_{A,m_n}^T(t)$ and $\phi_{E,m_n}^R(t)$ are an azimuth arrival angle and an elevation arrival angle corresponding to an m sub-path from $A_1^R$ to $C_n^Z$ at the time instant t; besides, motion conditions at the transmitter side, the receiver side and a motion conditions of the clusters are modeled by the model respectively, and three-dimensional motions of an arbitrary speed and an arbitrary trajectory of a transceiver and the clusters are supported, where $v^T(t)$, $v^R(t)$, $v^{A_n}(t)$, $v^{Z_n}(t)$ denote motion speeds at the transmitter side, the receiver side, the first-bounce cluster and cluster the last-bounce cluster respectively, $\alpha_A^T(t)$, $\alpha_A^R(t)$, $\alpha_A^{A_n}(t)$, $\alpha_A^{Z_n}(t)$ denote azimuth angles of the motor directions at the transmitter side, the receiver side, the first-bounce cluster and the last-bounce cluster respectively, $\alpha_E^T(t)$, $\alpha_E^R(t)$, $\alpha_E^{A_n}(t)$, $\alpha_E^{Z_n}(t)$ denote elevation angles of the motor direction at the transmitter side, the receiver side, the first-bounce cluster and the last-bounce cluster, respectively.

A channel matrix of the 6GPCM is represented as:

$$H = [PL \cdot SH \cdot BL \cdot WE \cdot AL]^{1/2} \cdot H_s,$$

where PL, SH, BL, WE, AL denote large-scale fadings, PL denotes a path loss, SH denotes a shadowing, BL denotes a blockage loss, AL denotes an atmospheric gas absorption loss, WE denotes a weather effect loss, $H_s$ denotes a small-scale fading channel matrix.

The small-scale fading channel matrix $H_s$ is represented as follows:

$$H_s = [h_{qp,f_c}(t, \tau)]_{M_R \times M_T},$$

where $M_T$ denotes the number of antenna elements in the transmitter antenna array, $M_R$ denotes the number of antenna elements in the receiver antenna array, $h_{qp,f_c}(t, \tau)$ denotes a channel impulse response between the array element $A_p^T$ in the transmitter antenna array and the array element $A_q^R$ in the receiver antenna array at the time instant t, which is represented as a superposition of an LoS component $h_{qp,f_c}^{LoS}(t, \tau)$ and a NLoS component $h_{qp,f_c}^{NLoS}(t, \tau)$:

$$h_{qp,f_c}(t, \tau) = \sqrt{\frac{K_R(t)}{K_R(t)+1}} h_{qp,f_c}^{LoS}(t, \tau) + \sqrt{\frac{1}{K_R(t)+1}} h_{qp,f_c}^{NLoS}(t, \tau),$$

where $K_R(t)$ denotes a Rice factor, $h_{qp,f_c}^{LoS}(t, \tau)$ and $h_{qp,f_c}^{NLoS}(t, \tau)$ are respectively represented as follows:

$$h_{qp,f_c}^{LoS}(t, \tau) = \begin{bmatrix} F_{q,f_c,V}(\phi_{E,L}^R(t), \phi_{A,L}^R(t)) \\ F_{q,f_c,H}(\phi_{E,L}^R(t), \phi_{A,L}^R(t)) \end{bmatrix}^T \begin{bmatrix} e^{j\theta_L^{VV}} & 0 \\ 0 & -e^{j\theta_L^{HH}} \end{bmatrix}$$

-continued $$F_r \begin{bmatrix} F_{p,f_c,V}(\phi_{E,L}^T(t), \phi_{A,L}^T(t)) \\ F_{p,f_c,H}(\phi_{E,L}^T(t), \phi_{A,L}^T(t)) \end{bmatrix} e^{j2\pi f_c \tau_{qp}^L(t)} \delta(\tau - \tau_{qp}^L(t))$$

$$h_{qp,f_c}^{NLoS}(t, \tau) = \sum_{n=1}^{N_{qp}(t)}$$

$$\sum_{m=1}^{M_n(t)} \begin{bmatrix} F_{q,f_c,V}(\phi_{E,m_n}^R(t), \phi_{A,m_n}^R(t)) \\ F_{q,f_c,H}(\phi_{E,m_n}^R(t), \phi_{A,m_n}^R(t)) \end{bmatrix}^T \begin{bmatrix} e^{j\theta_{m_n}^{VV}} & \sqrt{\mu \kappa_{m_n}^{-1}(t)} e^{j\theta_{m_n}^{VH}} \\ \sqrt{\kappa_{m_n}^{-1}(t)} e^{j\theta_{m_n}^{HV}} & \sqrt{\mu} e^{j\theta_{m_n}^{HH}} \end{bmatrix}$$

$$F_r \begin{bmatrix} F_{p,f_c,V}(\phi_{E,m_n}^T(t), \phi_{A,m_n}^T(t)) \\ F_{p,f_c,H}(\phi_{E,m_n}^T(t), \phi_{A,m_n}^T(t)) \end{bmatrix} \sqrt{P_{qp,m_n,f_c}(t)} e^{j2\pi f_c \tau_{qp,m_n}(t)} \delta(\tau - \tau_{qp,m_n}(t)),$$

where $\{*\}^T$ denotes a transposition operation, $f_c$ denotes a carrier frequency, $F_{p(q),f_c,V}$ and $F_{p(q),f_c,H}$ denote antenna patterns of the array element $A_p^T$ ($A_q^R$) for vertical and horizontal polarizations at different frequency bands, $\kappa_{m_n}(t)$ denotes a cross polarization power ratio, $\mu$ denotes a co-polar imbalance, $\phi_{A,L}^T(t)$ and $\phi_{E,L}^T(t)$ denote an azimuth departure angle and an elevation departure angle corresponding to the LoS path from $A_1^T$ to $A_1^R$ at the time instant t, $\phi_{A,L}^R(t)$ and $\phi_{E,L}^R(t)$ denote an azimuth arrival angle and an elevation arrival angle corresponding to the LoS path from $A_1^T$ to $A_1^R$ at the time instant t, $\theta_L^{VV}$, $\theta_L^{HH}$, $\theta_{m_n}^{VV}$, $\theta_{m_n}^{VH}$, $\theta_{m_n}^{HV}$ and $\theta_{m_n}^{HH}$ are random phases uniformly distributed over (0, 2π], $$F_r = \begin{pmatrix} \cos\psi_{l,m} & -\sin\psi_{l,m} \\ \sin\psi_{l,m} & \cos\psi_{l,m} \end{pmatrix}, \psi_{l,m} = 108/f_c^2$$

denotes a Faraday rotation angle, a unit of $f_c$ in which the Faraday rotation angle is calculated here in GHZ, $P_{qp,m_n,f_c}(t)$ denotes a power of m-th sub-path in n-th path from $A_1^T$ to $A_1^R$ at the NLoS condition, $\tau_{qp}^L(t)$ denotes a delay of the LoS path at the time instant t, $$\tau_{qp}^L(t) = \frac{\vec{d}_{qp}(t)}{c},$$

$\vec{d}_{qp}(t)$ denotes a vector distance between the transmitter antenna array $A_p^T$ and the receiver antenna array $A_q^R$ at the time instant t, c denotes the speed of light, $\tau_{qp,m_n}(t)$ denotes a delay of the m-th sub-path in the n-th path from $A_1^T$ to $A_1^R$ at the time instant t, $P_{qp,m_n,f_c}(t)$ denotes a power of the m-th sub-path in the n-th path from $A_1^T$ to $A_1^R$ at the time instant t, all of the above parameters are time-varying parameters.

When the method for pervasively modeling 6G channels is utilized in maritime communication scenarios, a LoS path component and multipath components of both a rough ocean surface and an evaporation duct over a sea surface are modeled as $h_{qp,f_c}^{LoS}(t, \tau)$, $h_{qp,f_c}^{NLoS_1}(t, \tau)$ and $h_{qp,f_c}^{NLoS_2}((t, \tau)$ by the model, and power control factors $S_1$ and $S_1$ are used to manipulate a disappearance and an appearance of corresponding parts with variations of distances between two ships, that is, a NLoS part of a formula for calculating $h_{qp,f_c}^{NLoS}(t, \tau)$ is divided into two parts: $h_{qp,f_c}^{NLoS_1}(t, \tau)$ and $h_{qp,f_c}^{NLoS_2}(t, \tau)$, and $S_1+S_2=1$; in IIoT scenarios, specular multipath components and dense multipath components are modeled as $h_{qp,f_c}^{NLoS_{SC}}(t, \tau)$ and $h_{qp,f_c}^{NLoS_{DMC}}(t, \tau)$ respectively, and modeling methods for $h_{qp,f_c}^{NLoS_1}(t, \tau)$, $h_{qp,f_c}^{NLoS_2}(t, \tau)$, $h_{qp,f_c}^{NLoS_{SC}}(t, \tau)$ and $h_{qp,f_c}^{NLoS_{DMC}}(t, \tau)$ are the same as that for $h_{qp,f_c}^{NLoS}(t, \tau)$ merely with different parameter values and different distributions of clusters.

When the method for pervasively modeling 6G channels is utilized in RIS scenarios, channels are divided into a sub-channel $H_{TI}$ from the transmitter side to the RIS, a sub-channel $H_{IR}$ from the RIS to the receiver side and a sub-channel $H_{TR}$ from the transmitter side to the receiver side, the three sub-channels are modeled respectively and a phase shift diagonal matrix $\Phi$ is introduced to implement an intelligent control for channel environments, calculation methods of $H_{IR}$, $H_{TI}$ and $H_{TR}$ are the same as that of $H_s$ merely with different parameter values and different distributions of clusters.

When the method for pervasively modeling 6G channels is utilized for VLC channels, on one hand, wavelengths of optical signals are extremely short, a size of the receiver is commonly multi-million wavelengths, with no rapid signal fading on multi-wavelengths, on another hand, due to an incoherent light emitted by an LED light in a VLC system, the optical signals has no phase information, and no rapid signal fading is caused after a superposition of real-valued multipath signals at the receiver side with an exhibition on a slow-varying shadowing, therefore although a current VLC model representation is a channel impulse response form of a multipath superposition, the representation is essentially a large-scale scale model of modeling PL and SH, that is, $H_s=1$, $PL \cdot SH = h_{p_V p_H}^{LoS}(t, \tau) + h_{p_V p_H}^{NLoS}(t, \tau) = P_{p_V p_H}^{LoS}(t) \cdot \delta(\tau - \tau_{p_V p_H}^{LoS}(t)) + P_{p_V p_H, m_n}^{NLoS}(t) \cdot \delta(\tau - \tau_{p_V p_H, m_n}(t))$, $p_H$, $p_V$ denote the number of rows and the number of columns in an LED array.

When the method for pervasively modeling 6G channels is utilized in multi-link scenarios:
Assuming that the number of base stations is $N_{BS}$ and the number of users is $N_{MS}$, a channel transmission matrix of a multi-link channel model is represented as a following formula:

$$H_M = \begin{bmatrix} H_{BS_1 MS_1} & \cdots & H_{BS_1 MS_{N_{MS}}} \\ \vdots & \ddots & \vdots \\ H_{BS_{N_{BS}} MS_1} & \cdots & H_{BS_{N_{BS}} M_{N_{MS}}} \end{bmatrix}_{N_{BS} \times N_{MS}},$$

$H_{BS_i MS_j}$, $i=1, 2 \ldots N_{BS}$, $j=1, 2 \ldots N_{MS}$ corresponding to each link is a single-link channel model H described above.

In the method for pervasively modeling 6G channels, detailed steps for generating the channel matrix H are specifically as follows.

In S1, propagation scenarios and conditions are set; a carrier frequency, an antenna type, a layout of the channel and a motion trajectory of the transceiver are determined.

In S2, path loss, shadowing, oxygen absorption and blockage effect loss are generated; the method mainly focuses on a modeling for a small-scale fading, and standard channel models are referable to a calculation the large scale fadings.

In S3, according to positions and motion conditions of the transceiver, large-scale parameters with spatial consistency for a delay spread (DS) and 4 angle spreads are generated.

Except SH, other corresponding large-scale parameters include a delay spread DS, an azimuth spread of arrival (ASA), an azimuth spread of departure (ASD), an elevation spread of arrival (ESA), an elevation spread of departure (ESD), a Rice factor ($K_R$) and a cross-polarization ratio (XPR), a generation of the DS is represented as a following formula:

$$DS_{f_c}(P) = DS_{\mu, f_c} + X^{DS}(P) \cdot DS_{\sigma, f_c},$$

$$\text{where } P = (P^T, P^R)$$

is composed of transceiver position vectors, $P^T(t)=(x^T(t), y^T(t), z^T(t))$ and $P^R(t)=(x^R t), y^R(t), z^R(t))$ denote a coordinate vector at the transmitter side and a coordinate vector at the receiver side at the time instant t, respectively, and initial values of which are generated according to simulation environments and requirements; $X^{DS}(P)$ denotes a normal distribution variable generated by a sine wave superposition method and following a spatial consistency with a mean value of 0 and a variance of 1, $DS_{\mu, f_c}$ denotes a mean value for DS in a frequency band $f_c$, and $DS_{\sigma, f_c}$ denotes a variance of DS in the frequency $f_c$, configuration values for $DS_{\sigma, f_c}$ are divided into three types according to a height $h_{UT}$ of a user terminal; for terrestrial mobile communication scenarios 1.5 m$\leq h_{UT} \leq$22.5 m, values set from Table 7.5-6 of 3GPP TR 38.901 are referable; for UAV scenarios 22.5 m$\leq h_{UT} \leq$300 m, values set from Table B1.2 of 3GPP TR 36.777 standardization document are referable; for satellite communication scenarios, values set from Table 6.7-2 of 3GPP TR 38.811 standardization document are referable; in NLoS conditions of urban macro Uma scenarios, when a carrier frequency ranges from 2 to 4 GHZ, $DS_{\mu, f_c}$ is calculated as follows:

$$\log_{10}(DS_{\mu, f_c}/1 \text{ s}) = \begin{cases} -0.204 \log_{10}(f_c) - 6.28, & 1.5 \text{ m} < h_{UT} \leq 22.5 \text{ m}, NLoS \\ 0.0965 \log_{10}(h_{UT}) - 7.503, & 22.5 \text{ m} < h_{UT} \leq 300 \text{ m}, NLoS \\ -7.21 & \text{(An elevation angle of the link is } 10°) \end{cases}$$

Generation processes of other large-scale parameters are the same as a generation process of the DS, values for all large-scale parameters with spatial consistency in a logarithm domain can be obtained by multiplying a cross-correlation matrix among the large-scale parameters, after 8 large-scale parameters are generated, subsequently values in the logarithm domain are required to be converted into a linear domain; so that the large-scale parameters of the channel are obtained.

In S4, scatterers following an ellipsoid Gaussian scattering distribution are generated, delays, angles and powers of the clusters are calculated according to geographical location information of the transceiver and the scatterers, and channel coefficients are generated.

In S5, the large-scale parameters and the small-scale parameters are updated according to movements of the transceiver and birth-death processes of the clusters; and new channel coefficients are generated. A space-time-frequency non-stationarity of the model is mainly reflected in two aspects, one is parameters for space-time-frequency variations, and another is birth-death processes of the clusters in a space-time-frequency domain, the number of clusters at the time instant t is calculated as follows:

$$N_{qp}(t) = N_{surv}(t) + N_{new}(t),$$

where $N_{qp}(t)$ denotes the number of the clusters, $N_{surv}(t)$ denotes the number of survived clusters determined by a survived probability $P_{surv}(\Delta t, \Delta r, \Delta f)$ of the clusters, $N_{new}(t)$ denotes the number of newly generated clusters following a Poisson distribution with a mean value $E[N_{new}(t)]$, $\lambda_G$ is defined as a birth rate of the clusters, $\lambda_R$ is defined as a combination rate of the clusters, that is, a death rate.

S4 is specifically as follows.
In S401, positions of the scatterers are obtained by using an ellipsoid Gaussian scattering distribution, the scatterers in n-th cluster centered on $(\bar{d}_n^X, \bar{\phi}_{E,n}^X, \bar{\phi}_{A,n}^X)$ follow a Gaussian distribution with standard deviations of $\sigma_x^X$, $\sigma_y^X$ and $\sigma_z^X$ on three axes, respectively; after obtaining the positions of the scatterers, the positions of the scatterers are converted into spherical coordinates; positions $\vec{C}_{m_n}^A(t_0)$ and $\vec{C}_{m_n}^Z(t_0)$ of the scatterers in n-th cluster corresponding to a position of a first transmitter antenna $\vec{A}_1^T(t_0)$ and a position of a first receiver antenna $\vec{A}_1^R(t_0)$ are represented as $\vec{C}_{m_n}^A(t_0)=(d_{m_n}^T(t_0), \phi_{A,m_n}^T(t_0), \phi_{E,m_n}^T(t_0))$ and $\vec{C}_{m_n}^Z(t_0)=(d_{m_n}^R(t_0), \phi_{A,m_n}^R(t_0), \phi_{E,m_n}^R(t_0))$, where $d_{m_n}^X(t_0)$, $\phi_{A,m_n}^X(t_0)$ and $\phi_{E,m_n}^X(t_0)$ denote a distance, an azimuth angle, and an elevation angle of m-th sub-path of n-th cluster at the transmitter side or the receiver side, respectively, $X \in \{T, R\}$ denotes the transmitter side and the receiver side.

In S402, in a multi-bounce channel model, delays of sub-paths in the cluster at an initial time instant are calculated by $$\tau_{qp,m_n}(t_0) = \frac{\left(d_{p,m_n}^T(t_0) + d_{q,m_n}^R(t_0)\right)}{c} + \tilde{\tau}_{m_n}(t_0),$$

where $\tilde{\tau}_{m_n}$ denotes a delay of virtual links between $\vec{C}_{m_n}^A$ and $\vec{C}_{m_n}^Z$, $d_{p,m_n}^T(t_0)$ denotes a distance between $A_p^T$ and $C_{m_n}^A$ at the time instant $t_0$, and $d_{q,m_n}^R(t_0)$ denotes a distance between $A_q^R$ and $C_{m_n}^Z$ at the time instant $t_0$, $$\tilde{\tau}_{m_n}(t_0) = \frac{\tilde{d}_{m_n}(t_0)}{c} + \tau_{link}(t_0),$$

$\tilde{d}_{m_n}(t_0)$ denotes a distance between the first-bounce cluster and the last-bounce cluster, $\tau_{link}$ denotes a non-negative variable following an exponential distribution.

In S403, in (ultra-)massive MIMO scenarios, a sub-paths power $P_{qp,m_n,f_c}(t)$ in the clusters is varied along a time axis and an array axis, and the sub-paths power is commonly modeled as a lognormal process varying with time and a lognormal process varying with the array, a non-normalized sub-paths power $P'_{qp,m_n,f_c}(t)$ in the clusters is:

$$P'_{qp,m_n,f_c}(t) = \underbrace{\exp\left(-\tau_{qp,m_n}(t)\frac{r_\tau - 1}{r_\tau DS}\right)10^{-\frac{Z_n}{10}}}_{A\ time\ domain} \cdot \underbrace{\xi_n(p,q)}_{A\ space\ domain},$$

where $Z_n$ denotes a per cluster shadowing term in dB, $r_\tau$ denotes a delay distribution proportionality factor, $\xi_n(p, q)$ denotes a two-dimensional spatial lognormal process for simulating smooth power variations over antenna arrays.

In wide bandwidth scenarios, a power value is multiplied by $$\left(\frac{f}{f_c}\right)^{\gamma_{m_n}}$$

in a frequency domain by taking frequency domain non-stationary characteristics into account, where $\gamma_{m_n}$ is a frequency-dependent constant factor, eventually, an ultimate power $P_{qp,m_n,f_c}(t)$ of the sub-paths in the clusters is obtained by normalizing the powers of all clusters; if the clusters are newly generated, $\tau_{qp,m_n}(t)$ is substituted with $\tau_{qp,m_n}(t_0)$ to obtain an initial power of the m-th sub-path in the n-th cluster between $A_p^T$ and $A_q^R$.

In S404, for the survived clusters, small-scale parameters such as the powers and the delays of the sub-paths in the clusters at different time instants are required to be updated, for a trajectory segment at the time instant $t_1$, that is, at a subsequent time instant after the clusters are generated, a coordinate of the p-th transmitter antenna $A_p^T$ is:

$$\vec{A}_p^T(t_1) = \vec{A}_p^T(t_0) + v^T(t_1 - t_0) \cdot \begin{bmatrix} \cos\alpha_A^T \cdot \cos\alpha_E^T \\ \sin\alpha_A^T \cdot \cos\alpha_E^T \\ \sin\alpha_E^T \end{bmatrix}^T,$$

where a coordinate $\vec{A}_p^T(t_0)$ of the p-th transmitter antenna at the initial time instant is calculated by $$\vec{A}_p^T(t_0) = \vec{A}_1^T(t_0) + (p-1) \cdot \delta_T \cdot \begin{bmatrix} \cos\beta_A^T \cdot \cos\beta_E^T \\ \sin\beta_A^T \cdot \cos\beta_E^T \\ \sin\beta_E^T \end{bmatrix}^T,$$

a coordinate $\vec{C}_{m_n}^A(t_1)$ of an m-th scatterer in a n-th first-bounce cluster is calculated by $$\vec{C}_{m_n}^A(t_1) = \vec{C}_{m_n}^A(t_0) + v^{A_n}(t_1 - t_0) \cdot \begin{bmatrix} \cos\alpha_A^{A_n} \cdot \cos\alpha_E^{A_n} \\ \sin\alpha_A^{A_n} \cdot \cos\alpha_E^{A_n} \\ \sin\alpha_E^{A_n} \end{bmatrix}^T$$

at the time instant $t_1$. A distance from $A_p^T$ to $C_{m_n}^A$, is obtained by calculating $d_{p,m_n}^T(t_1) = \|\vec{C}_{m_n}^A(t_1) - \vec{A}_p^T(t_1)\|$ similarly, a distance $d_{q,m_n}^R(t_1)$ from $A_q^R$ to $C_{m_n}^Z$ is obtained; a delay of the sub-path in the clusters at the time instant $t_1$ is $\tau_{qp,m_n}(t_1) = (d_{p,m_n}^T(t_1) + d_{q,m_n}^R(t_1))/c + \tilde{\tau}_{m_n}$; $\tau_{qp,m_n}(t)$ and $P_{qp,m_n}(t)$ are obtained by using geographical locations of the transmitter, the receiver, and the scatterer at a previous time instant, $(t=t_2, t_3, \ldots)$.

In S5, in order to model a space-time-frequency evolution process of the clusters more accurately, two types of sampling intervals are introduced, one type is a time domain sampling interval $\Delta t$, a frequency domain sampling interval $\Delta f$ and a space domain (array domain) sampling interval $\Delta r$, and channel parameters are updated continuously, another type is described by $\Delta t_{BD}$, $\Delta f_{BD}$ and $\Delta r_{BD}$ that are integer multiples of corresponding $\Delta t$, $\Delta f$ and $\Delta r$, and during the birth-death processes and the evolution processes of the clusters occurred at sampling points, survival probabilities of the transmitter side and receiver side clusters along the array axis and time axis are as follows:

$$P_{surv}^T(\Delta t_{BD}, \delta_p) = e^{-\lambda_R\left((\epsilon_1^T)^2 + (\epsilon_2^T)^2 + 2\epsilon_1^T\epsilon_2^T\cos(\alpha_A^T - \beta_A^T)\right)^{1/2}}$$

$$P_{surv}^R(\Delta t_{BD}, \delta_q) = e^{-\lambda_R\left((\epsilon_1^R)^2 + (\epsilon_2^R)^2 + 2\epsilon_1^R\epsilon_2^R\cos(\alpha_A^R - \beta_A^R)\right)^{1/2}}$$

where $\epsilon_1^T = \frac{\delta_p \cos\beta_E^T}{D_c^A}\left(\epsilon_1^R = \frac{\delta_q \cos\beta_E^R}{D_c^A}\right)$ and $\epsilon_2^T = \frac{v^T \Delta t_{BD}}{D_c^S}\left(\epsilon_2^R = \frac{v^R \Delta t_{BD}}{D_c^S}\right)$ denote position differences of a transmitter antenna element and a receiver antenna element on the array axis and the time axis, respectively, $D_c^A$ and $D_c^S$ denote scenario-dependent factors on the array axis and the time axis, respectively, a joint survived probability of the transmitter side and receiver side clusters is represented as follows:

$$P_{surv}(\Delta t_{BD}, \delta_p, \delta_q) = P_{surv}^T(\Delta t_{BD}, \delta_p) P_{surv}^R(\Delta t_{BD}, \delta_q).$$

The average number of the newly generated clusters is:

$$E(N_{new}) = \frac{\lambda_G}{\lambda_R}(1 - P_{surv}(\Delta t_{BD}, \Delta r_{BD})).$$

When wide bandwidth scenarios are studied, the birth-death processes of the clusters also exist on a frequency axis, and a survival probability of the clusters on the frequency axis is:

$$P_{surv}(\Delta f_{BD}) = e^{-\lambda_R \frac{F(\Delta f_{BD})}{D_c^f}},$$

where $F(\Delta f_{BD})$ and $D_c^f$ are determined by channel measurements, $D_c^f$ denotes a scenario-dependent factor on the frequency axis, in summary, when the birth-death processes of the space-time-frequency domain clusters are taken into account, the survival probability of the clusters is:

$$P_{surv}(\Delta t_{BD}, \Delta r_{BD}, \Delta f_{BD}) = P_{surv}^T(\Delta t_{BD}, \delta_p) P_{surv}^R(\Delta t_{BD}, \delta_q) P_{surv}(\Delta f_{BD}).$$

The average number of the newly generated clusters is:

$$E(N_{new}) = \frac{\lambda_G}{\lambda_R}(1 - P_{surv}(\Delta t_{BD}, \Delta r_{BD}, \Delta f_{BD})).$$

In UHST scenarios, by taking account of a waveguide effect and an impact of tube wall roughness on channels in vacuum tube UHST scenarios, the average number of the newly generated clusters is:

$$E(N_{new}) = \frac{\lambda_G}{\lambda_R}(1 - P_{surv}(\Delta t_{BD}, \Delta r_{BD}, \Delta f_{BD}))\left(1 - \frac{D_{qp}(t)}{D}\right) \cdot \frac{\rho_s}{\rho_{s_0}}$$

$$\rho_s = e^{\left(-8\left(\frac{\pi \sigma_h \cos(E[\phi_{E,m_n}^T])}{\lambda}\right)^2\right)},$$

where $D_{qp}(t)$ denotes a linear distance between the transmitter side and the receiver side at the time instant t, D denotes an initial distance between the transmitter side and the receiver side, $\rho_s$ denotes a scattering coefficient of the tube wall, and $\rho_{s_0}$ denotes a scattering coefficient with a roughness of $\sigma_h = 0$.

Technical effects: proposed in the present disclosure is a pervasive channel modeling theory, and the theory is applied to the geometry-based stochastic channel model (GBSM). By using the cluster-based geometry-based stochastic channel modeling method and framework, and using the unified channel impulse response expression, the 6G channels characteristics for all frequency bands and all scenarios can be modeled, and a 6GPCM based on the pervasive channel modeling theory is proposed, which is basically suitable for all spectra such as sub-6 GHz, mm Wave, THz and VLC channels, full-coverage scenarios channels such as satellites, UAV and maritime communications, as well as full-application scenarios channels such as ultra-massive MIMO, IIoT, and RIS. Moreover, the 6GPCM can be simplified into a dedicated channel model of specific frequency bands and specific scenarios by adjusting the parameters. 6GPCM is extremely important for 6G channel model standardization, 6G generic theory technology research and system fusion construction.

DETAILED DESCRIPTION OF THE EMBODIMENTS

In order to realize the above objectives, the present disclosure proposes a pervasive channel modeling theory, and proposes a 6GPCM based on the theory. Therefore, the present disclosure mainly includes two parts: the pervasive channel model modeling theory and the 6GPCM construction.

1. The Pervasive Channel Model Modeling Theory

Figure 1:
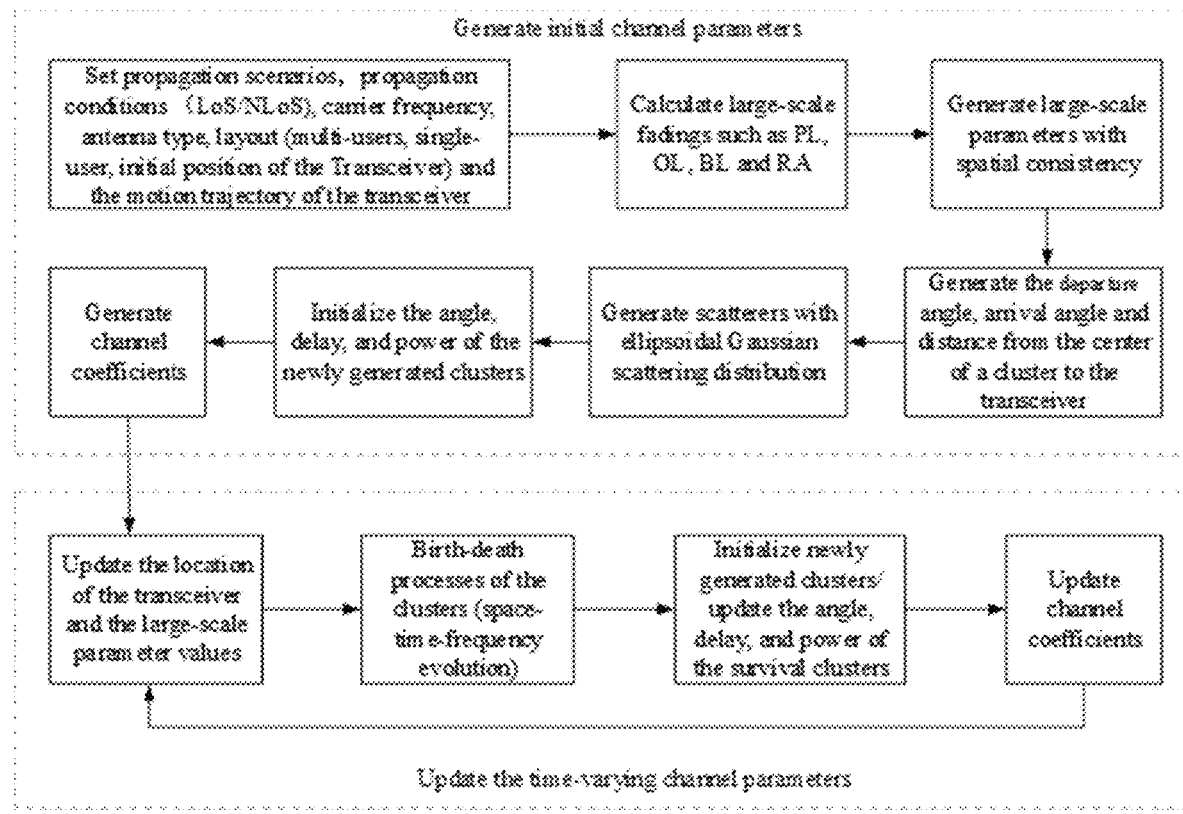
FIG. 1 illustrates a flow diagram of the embodiments in the present disclosure.
Figure 2:
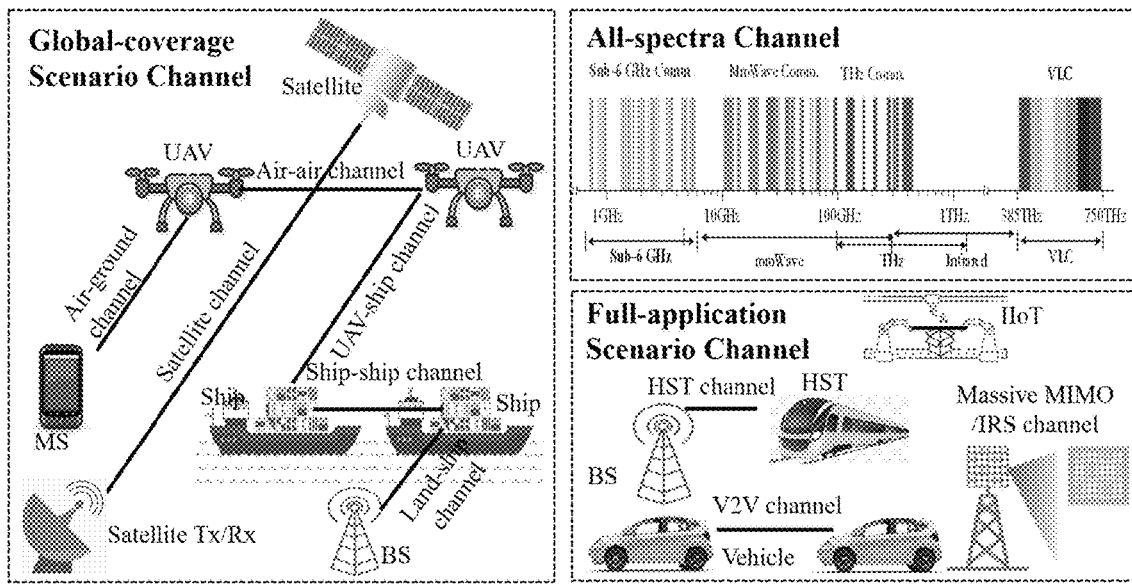
FIG. 2 illustrates a schematic diagram of 6G wireless channels in the embodiments of the present disclosure.
Figure 3:
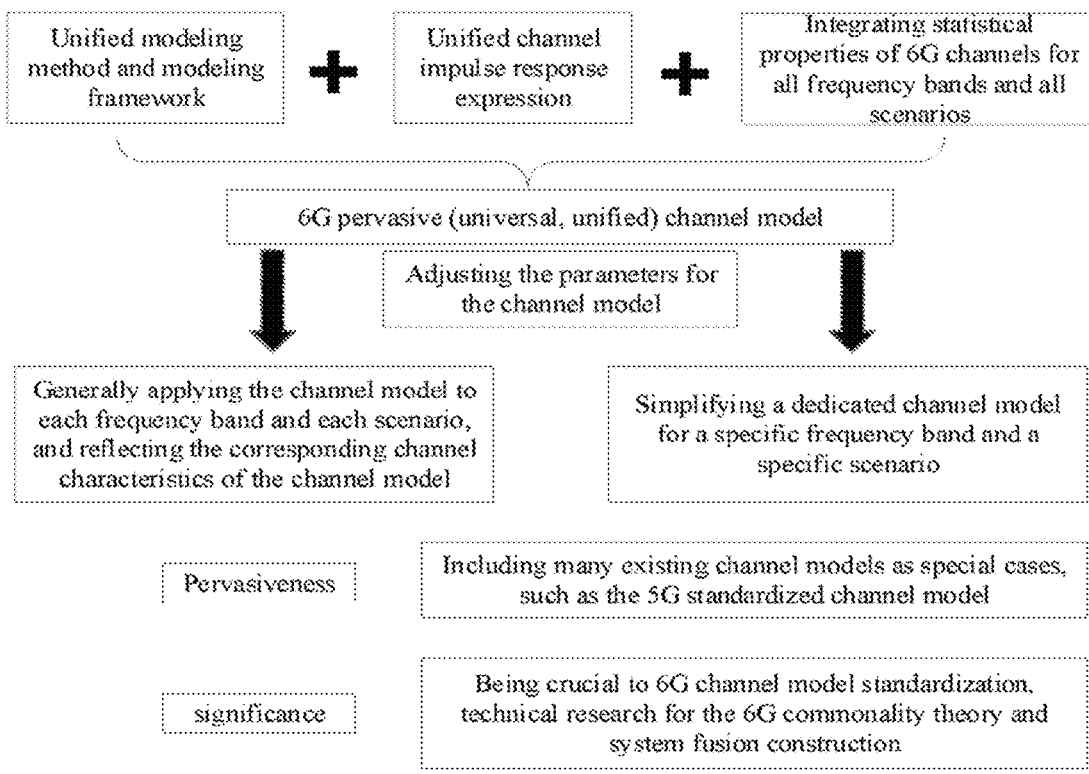
FIG. 3 illustrates a schematic diagram of a pervasive channel modeling theory in the present disclosure.

The pervasive channel modeling theory is utilizing a unified channel modeling method and framework, a unified channel impulse response expression, and a comprehensive consideration of the characteristics of 6G channels for all frequency bands and all scenarios, to construct a 6G pervasive channel model that is generally applicable to all frequency bands and scenarios of 6G and that can accurately reflect the channel characteristics of 6G, as illustrated in FIG. 3. At the same time, the 6G pervasive channel model can be simplified into a dedicated channel model of specific frequency bands and specific scenarios by adjusting the parameters for the channel model. Through the analysis on the 6G pervasive channel model, the complex mapping relationship between channel model parameters, channel characteristics and communication system performance can be studied. As a unified channel model framework, 6GPCM is extremely important for 6G channel model standardization, 6G generic theory technology research and system fusion construction.

2. The 6GPCM

Figure 4:
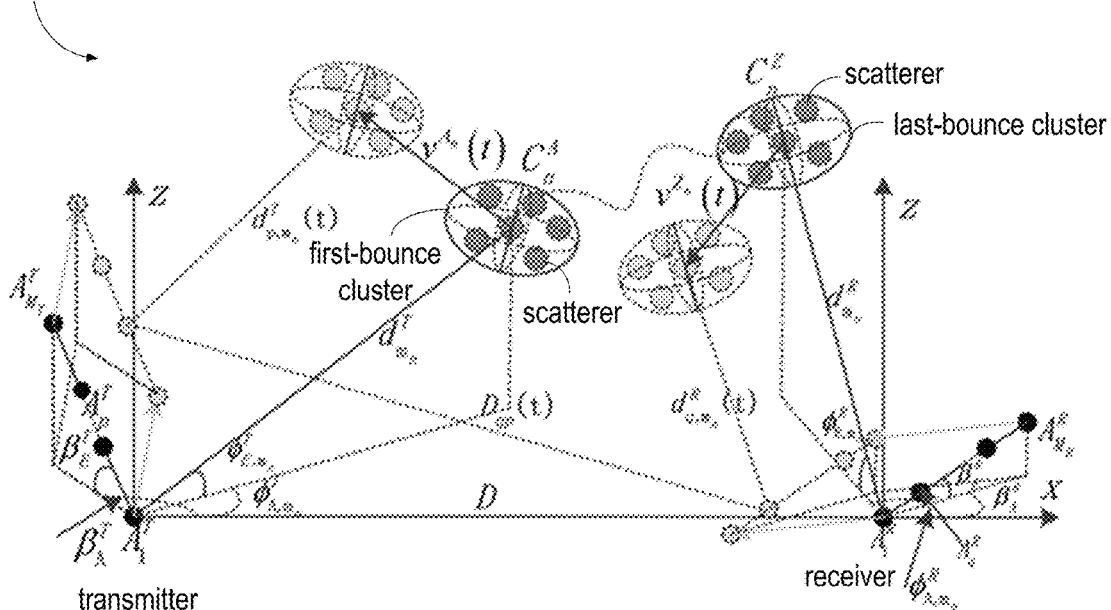
FIG. 4 illustrates a schematic diagram of a 6GPCM in the present disclosure.

The 6GPCM is as illustrated in FIG. 4. The antenna types in the model can be antenna array types such as uniform linear array and uniform planner array, and an arbitrary antenna polarization type is supported. Uniform linear arrays are adopted at both transmitter side and receiver side as illustrated in the schematic diagram and the model in the schematic diagram is a multi-bounce propagation model. $A_p^T$ denotes the p-th array element of a transmitter antenna array $A^T$ where A denotes an antenna array and T denotes the transmitter, $A_1^T$ denotes the first array element of the transmitter antenna array $A^T$, $A_{M_T}^T$ denotes the $M_T$-th array element of the transmitter antenna array $A^T$, $A_q^R$ denotes the q-th array element of a receiver antenna array $A^R$ where A denotes an antenna array and R denotes the receiver, $A_1^R$ denotes the first array element of the receiver antenna array $A^R$, $A_{M_R}^R$ denotes the $M_R$-th array element of the receiver antenna array $A^R$, and the distance between the transmitter antenna array and the receiver antenna array is $\delta_T$, ($\delta_R$); $\beta_A^T$ denotes an azimuth angle $\beta_A$ of the transmitter antenna array $A^T$ in an xy plane, $\beta_A^R$ denotes an azimuth angle $\beta_A$ of the receiver antenna array $A^R$ in the xy plane, and $\beta_E^T$ denotes an elevation angle $\beta_E$ of the transmitter antenna array $A^T$ and $\beta_E^R$ denotes an elevation angle $\beta_E$ of the receiver antenna array $A^R$; for better understanding, the n-th (n=1, 2, 3, I, $N_{qp}(t)$) propagation path from $A_p^T$ to $A_q^R$ is merely described herein, where $C_n^A$ denotes a first-bounce cluster of the n-th path proximity to the transmitter side, $C_n^Z$ denotes a last-bounce cluster proximity to the receiver side, and a propagation path between the two clusters is modeled as a virtual link. When a delay of the virtual link between the first-bounce cluster and the last-bounce cluster is zero, the model is reduced to a single-bounce model; besides, $N_{qp}(t)$ is the number of paths from $A_p^T$ to $A_q^R$ at a time instant t corresponding to $N_{qp}(t)$ cluster pairs in a double-cluster model with the first-bounce cluster and the last-bounce cluster in one-to-one correspondence with each other, and corresponding to $N_{qp}(t)$ clusters in a single-cluster model; on the microscopic level, analyzing clusters $C_n^A$ and $C_n^Z$ on the n-th path, and $M_n(t)$ scatterers are existed in the clusters, $C_{m_n}^A$ denotes the m-th scatterer in $C_n^A$, $C_{m_n}^Z$ denotes the m-th scatterer in $C_n^Z$; from the view point of the path, $C_{m_n}^A$ is understood as a scatterer connected by the m-th sub-path from $A_p^T$ to $C_n^A$, and $C_{m_n}^Z$ is understood as a scatterer connected by the m-th sub-path from $A_q^R$ to $C_n^Z$; besides, $\phi_{A,m_n}^T$ and $\phi_{E,m_n}^T$ denote an azimuth departure angle and an elevation departure angle corresponding to the m-th sub-path from $A_1^T$ to $C_n^A$, $\phi_{A,m_n}^T(t)$ and $\phi_{E,m_n}^T(t)$ denote an azimuth departure angle and an elevation departure angle corresponding to the m-th sub-path from $A_1^T$ to $C_n^A$ at the time instant t, $\phi_{A,m_n}^R$ and $\phi_{E,m_n}^R$ denote an azimuth arrival angle and an elevation arrival angle corresponding to the m-th sub-path from $A_1^R$ to $C_n^Z$, $\phi_{A,m_n}^R(t)$ and $\phi_{E,m_n}^R(t)$ are and azimuth arrival angle and an elevation arrival angle corresponding to the m-th sub-path from $A_1^R$ to $C_n^Z$ at the time instant t; besides, motion conditions at the transmitter side, the receiver side and a motion conditions of the clusters are modeled by the model respectively, and the three-dimensional motions of an arbitrary speed and an arbitrary trajectory of the transceiver and the clusters are supported, where $v^T(t)$, $v^R(t)$, $v^{A_n}(t)$, $v^{Z_n}(t)$ denote motion speeds at the transmitter side, the receiver side, the first-bounce cluster and the last-bounce cluster, respectively, $\alpha_A^T(t)$, $\alpha_A^R(t)$, $\alpha_A^{A_n}(t)$, $\alpha_A^{Z_n}(t)$ denote azimuth angles of the motor directions at the transmitter side, the receiver side, the first-bounce cluster and the last-bounce cluster, respectively, $\alpha_E^T(t)$, $\alpha_E^R(t)$, $\alpha_E^{A_n}(t)$, $\alpha_E^{Z_n}(t)$ denote elevation angles of the motor direction at the transmitter side, the receiver side, the first-bounce cluster and the last-bounce cluster, respectively, D denotes an initial distance between the transmitter side and the receiver side, $D_{qp}(t)$ denotes a linear distance between the transmitter side and the receiver side at the time instant t, $d_{m_n}^T$ denotes a vector distance between $A_1^T$ and the m-th scatterer in $C_n^A$, $d_{p,m_n}^T$ denotes a vector distance between $A_p^T$ and the m-th scatterer in $C_n^A$, $d_{m_n}^R$ denotes a vector distance between $A_1^R$ and the m-th scatterer in $C_n^Z$, and $d_{q,m_n}^R$ denotes a vector distance between $A_q^R$ and the m-th scatterer in $C_n^Z$.

A channel matrix of a 6GPCM is represented as:

$$H = [PL \cdot SH \cdot BL \cdot WE \cdot AL]^{1/2} \cdot H_s,$$

where PL, SH, BL, WE, AL denote large-scale fading, PL denotes path loss, SH denotes shadowing, BL denotes blockage loss, AL denotes atmospheric gas absorption loss, such as the oxygen absorption loss at the mm Wave band and the molecular absorption loss at the THz band, WE denotes weather effect loss, such as rain attenuation loss in satellite communication scenarios. The present disclosure mainly focuses on the calculation of small-scale fading $H_s$, and the method is as follows:

$$H_s = [h_{qp,f_c}(t, \tau)]_{M_R \times M_T},$$

where $M_T$ denotes the number of antenna elements in the transmitter antenna array, $M_R$ denotes the number of antenna elements in the receiver antenna array, $h_{qp,f_c}(t, \tau)$ denotes a channel impulse response between the array element $A_p^T$ in the transmitter antenna array and the array element $A_q^R$ in the receiver antenna array at the time instant t, which is represented as the superposition of the LoS component $h_{qp,f_c}^{LoS}(t, \tau)$ and the NLoS component $h_{qp,f_c}^{NLoS}(t, \tau)$:

$$h_{qp,f_c}(t, \tau) = \sqrt{\frac{K_R(t)}{K_R(t)+1}} h_{qp,f_c}^{LoS}(t, \tau) + \sqrt{\frac{1}{K_R(t)+1}} h_{qp,f_c}^{NLoS}(t, \tau),$$

where $K_R(t)$ denotes a Rice factor, $h_{qp,f_c}^{LoS}(t, \tau)$ and $h_{qp,f_c}^{NLoS}(t, \tau)$ are respectively represented as follows:

$$h_{qp,f_c}^{LoS}(t, \tau) = \begin{bmatrix} F_{q,f_c,V}(\phi_{E,L}^R(t), \phi_{A,L}^R(t)) \\ F_{q,f_c,H}(\phi_{E,L}^R(t), \phi_{A,L}^R(t)) \end{bmatrix}^T \begin{bmatrix} e^{j\theta_L^{VV}} & 0 \\ 0 & -e^{j\theta_L^{HH}} \end{bmatrix}$$
$$F_r \begin{bmatrix} F_{p,f_c,V}(\phi_{E,L}^T(t), \phi_{A,L}^T(t)) \\ F_{p,f_c,H}(\phi_{E,L}^T(t), \phi_{A,L}^T(t)) \end{bmatrix} e^{j2\pi f_c \tau_{qp}^L(t)} \delta * \tau - \tau_{qp}^L(t))$$

$$h_{qp,f_c}^{NLoS}(t, \tau) =$$
$$\sum_{n=1}^{N_{qp}(t)} \sum_{m=1}^{M_n(t)} \begin{bmatrix} F_{q,f_c,V}(\phi_{E,m_n}^R(t), \phi_{A,m_n}^R(t)) \\ F_{q,f_c,H}(\phi_{E,m_n}^R(t), \phi_{A,m_n}^R(t)) \end{bmatrix}^T \begin{bmatrix} e^{j\theta_{m_n}^{VV}} & \sqrt{\mu \kappa_{m_n}^{-1}(t)} e^{j\theta_{m_n}^{VH}} \\ \sqrt{\kappa_{m_n}^{-1}(t)} e^{j\theta_{m_n}^{HV}} & \sqrt{\mu} e^{j\theta_{m_n}^{HH}} \end{bmatrix}$$
$$F_r \begin{bmatrix} F_{p,f_c,V}(\phi_{E,m_n}^T(t), \phi_{A,m_n}^T(t)) \\ F_{p,f_c,H}(\phi_{E,m_n}^T(t), \phi_{A,m_n}^T(t)) \end{bmatrix} \sqrt{P_{qp,m_n,f_c}(t)} e^{j2\pi f_c \tau_{qp,m_n}(t)\delta(\tau - \tau_{qp,m_n}(t))},$$

where $\{*\}^T$ denotes a transposition operation, $f_c$ denotes a carrier frequency, $F_{p(q),f_c,V}$ and $F_{p(q),f_c,H}$ denote antenna patterns of the array element $A_p^T$ ($A_q^R$) for vertical and horizontal polarizations at different frequency bands, $\kappa_{m_n}(t)$ denotes a cross polarization power ratio, $\mu$ denotes a co-polar imbalance, $\phi_{A,L}^T(t)$ and $\phi_{E,L}^T(t)$ denote an azimuth departure angle and an elevation departure angle corresponding to an LoS path from $A_1^T$ to $A_1^R$ at the time instant t, $\phi_{A,L}^R(t)$ and $\phi_{E,L}^R(t)$ denote an azimuth arrival angle and an elevation arrival angle corresponding to an LoS path from $A_1^T$ to $A_1^R$ at the time instant t, $\theta_L^{VV}$, $\theta_L^{HH}$, $\theta_{m_n}^{VV}$, $\theta_{m_n}^{VH}$, $\theta_{m_n}^{HV}$ and $\theta_{m_n}^{HH}$ are random phases uniformly distributed over $[0,2\pi]$, $$F_r = \begin{pmatrix} \cos\psi_{l,m} & -\sin\psi_{l,m} \\ \sin\psi_{l,m} & \cos\psi_{l,m} \end{pmatrix}, \psi_{l,m} = 108/f_c^2$$

denotes a Faraday rotation angle, the unit of $f_c$ in which the Faraday rotation angle is calculated here in GHz, $P_{qp,m_n,f_c}(t)$ denotes a power of the m-th sub-path in the n-th path from $A_1^T$ to $A_1^R$ at the NLoS condition, $\tau_{qp}^L(t)$ denotes a delay of the LoS path at the time instant t, $$\tau_{qp}^L(t) = \frac{\vec{d}_{qp}(t)}{c},$$

$\vec{d}_{qp}(t)$ denotes a vector distance between the transmitter antenna array $A_p^T$ and the receiver antenna array $A_q^R$ at the time instant t, c denotes a speed of light, $\tau_{qp,m_n}(t)$ denotes a delay of the m-th sub-path in the n-th path from $A_1^T$ to $A_1^R$ at the time instant t, $P_{qp,m_n f_c}(t)$ denotes a power of the m-th sub-path in the n-th path from $A_1^T$ to $A_1^R$ at the time instant t, all of the above parameters are time-varying parameters.

It is worth noting that in maritime communication channel scenarios, the LoS path component and multipath components of both rough ocean surface and evaporation duct over the sea surface are modeled as $h_{qp,f_c}^{LoS}(t, \tau)$, $h_{qp,f_c}^{NLoS_1}(t, \tau)$ and $h_{qp,f_c}^{NLoS_2}(t, \tau)$ by the model, and the power control factors $S_1$ and $S_1$ are used to manipulate the disappearance and appearance of corresponding parts with variations of distances between two ships, that is, a NLoS part of a formula for calculating $h_{qp,f_c}^{NLoS}(t, \tau)$ is divided into two parts: $h_{qp,f_c}^{NLoS_1}(t, \tau)$ and $h_{qp,f_c}^{NLoS_2}(t, \tau)$, and $S_1+S_2=1$; in IIoT scenarios, specular multipath components and dense multipath components are modeled as $h_{qp,f_c}^{NLoS_{SC}}(t, \tau)$ and $h_{qp,f_c}^{NLoS_{DMC}}(t, \tau)$ respectively, and the modeling methods for $h_{qp,f_c}^{NLoS_1}(t, \tau)$, $h_{qp,f_c}^{NLoS_2}(t, \tau)$, $h_{qp,f_c}^{NLoS_{SC}}(t, \tau)$ and $h_{qp,f_c}^{NLoS_{DMC}}(t, \tau)$ are the same as that for $h_{qp,f_c}^{NLoS}(t, \tau)$ merely with different parameter values and different distributions of clusters. In RIS scenarios, channels are divided into a sub-channel $H_{TI}$ from the transmitter side to the RIS, a sub-channel $H_{IR}$ from the RIS to the receiver side and a sub-channel $H_{TR}$ from the transmitter side to the receiver side, the three sub-channels are modeled respectively and a phase shift diagonal matrix $\Phi$ is introduced to implement an intelligent control for channel environments, calculation methods of $H_{IR}$, $H_{TI}$ and $H_{TR}$ are the same as that of $H_s$ merely with different parameter values and different distributions.

For VLC channels, on one hand, wavelengths of optical signals are extremely short, a size of the receiver is commonly multi-million wavelengths, with no rapid signal fading rapidly on multi-wavelengths, on another hand, due to an incoherent light emitted by an LED light in a VLC system, the optical signals has no phase information, and no rapid signal fading is caused after a superposition of real-valued multipath signals at the receiver side with an exhibition on a slow-varying shadowing, therefore although a current VLC model representation is a channel impulse response form of a multipath superposition, the representation is essentially a large-scale model of modeling PL and SH, that is, $$H_s = 1, PL \cdot SH = h_{p_V p_H}^{LoS}(t, \tau) + h_{p_V p_H}^{NLoS}(t, \tau) =$$
$$P_{P p_V p_H}^{LoS}(t) \cdot \delta(\tau - \tau_{p_V p_H}^{LoS}(t)) + P_{p_V p_H, m_n}^{NLoS}(t) \cdot \delta(\tau - \tau_{p_V p_H, m_n}(t)),$$

$p_H$, $p_V$ denote the number of rows and the number of columns in an LED array.

When multi-users scenarios are taken into account, assuming that the number of base station is $N_{BS}$ and the number of user is $N_{MS}$, a channel transmission matrix of a multi-link channel model is represented as a following formula:

$$H_M = \begin{bmatrix} H_{BS_1 MS_1} & \cdots & H_{BS_1 MS_{N_{MS}}} \\ \vdots & \ddots & \vdots \\ H_{BS_{N_{BS}}} & \cdots & H_{BS_{N_{BS}} MS_{N_{MS}}} \end{bmatrix}_{N_{BS} \times N_{MS}},$$

$H_{BS_i MS_j}$, i=1, 2 ... $N_{BS}$, j=1, 2 ... $N_{MS}$ corresponding to each link is a single-link channel model H described above.

The detailed steps for generating the channel coefficients are specifically as follows.

In S1, propagation scenarios and propagation conditions are set; the carrier frequency, the antenna type, the layout of the transceiver and the motion trajectory of the transceiver are determined.

In S2, the path loss, the shadowing, the oxygen absorption and the large scale fading of blockage effect are generated; the method mainly focuses on a modeling for the small-scale fading, and standard channel models for large scale fading are referable to the calculation of this part.

In S3, according to positions and motion conditions of the transceiver, large-scale parameters with spatial consistency for the DS and 4 angle spreads are generated.

Except SH, other corresponding large-scale parameters include DS, ASA, ASD, ESA, ESD, $K_R$ and XPR. The generation method of large-scale parameters is the same. The generation of the DS is taken as an example herein and represented as the following formula:

$$DS_{f_c}(P) = DS_{\mu, f_c} + X^{DS}(P) \cdot DS_{\sigma, f_c}, \text{ where } P(P^T, P^R)$$

is composed of transceiver position vectors, $P^T(t) = (x^T(t), y^T(t), z^T(t))$ and $P^R(t) = (x^R(t), y^R(t), z^R(t))$ denote a coordinate vector at the transmitter side and a coordinate vector at the receiver side, respectively, and initial values of which are generated according to simulation environments and requirements; $X^{DS}(P)$ denotes a normal distribution variable generated by the sine wave superposition method and following the spatial consistency with the mean value of 0 and the variance of 1, $DS_{\mu, f_c}$ denotes a mean value for DS in a frequency $f_c$, and $DS_{\sigma, f_c}$ denotes a variance of DS in the frequency $f_c$, configuration values for $DS_{\sigma, f_c}$ are divided into three types according to the height $h_{UT}$ of the user terminal; for terrestrial mobile communication scenarios 1.5 m≤$h_{UT}$≤22.5 m, values set from Table 7.5-6 of 3GPP TR 38.901 are referable; for UAV scenarios 22.5 m≤$h_{UT}$≤300 m, values set from Table B1.2 of 3GPP TR 36.777 standardization document are referable; for satellite communication scenarios, values set from Table 6.7-2 of 3GPP TR 38.811 standardization document are referable; in NLoS conditions of urban macro Uma scenarios, when a carrier frequency ranges from 2 to 4 GHz, $DS_{\mu, f_c}$ is calculated as follows:

$$\log_{10}(DS_{\mu, f_c}/1 \text{ s}) = \begin{cases} -0.204\log_{10}(f_c) - 6.28, & 1.5 \text{ m} < h_{UT} \leq 22.5 \text{ m}, NLoS \\ 0.0965\log_{10}(h_{UT}) - 7.503, & 22.5 \text{ m} < h_{UT} \leq 300 \text{ m}, NLoS \\ -7.21 & \text{(An elevation angle of the link is } 10°) \end{cases}$$

All 8 large-scale parameters are independently generated by this method, values for all large-scale parameters with spatial consistency in a logarithm domain can be obtained by multiplying a cross-correlation matrix among the large-scale parameters, subsequently values in the logarithm domain are required to be converted into a linear domain; so that the large-scale parameters of the channel are obtained.

In S4, scatterers following an ellipsoid Gaussian scattering distribution are generated, delays, angles and powers of the clusters are calculated according to geographical location information of the transceiver and the scatterers, and channel coefficients are generated.

In S401, positions of the scatterers are obtained by using an ellipsoid Gaussian scattering distribution, the scatterers in the n-th cluster centered on $(\bar{d}_n^X, \bar{\phi}_{E,n}^X, \bar{\phi}_{A,n}^X)$ follow a Gaussian distribution with standard deviations of $\sigma_x^X, \sigma_y^X$ and $\sigma_z^X$ on three axes respectively; after obtaining the positions of the scatterers, the positions of the scatterers are converted into spherical coordinates; positions $\vec{C}_{m_n}^A(t_0)$ and $\vec{C}_{m_n}^Z(t_0)$ of the scatterers in the n-th cluster corresponding to a position of a first transmitter antenna $\vec{A}_1^T(t_0)$ and a position of a first receiver antenna $\vec{A}_1^R(t_0)$ are represented as $\vec{C}_{m_n}^A(t_0)=(d_{m_n}^T(t_0), \phi_{A,m_n}^T(t_0), \phi_{E,m_n}^T(t_0))$ and $\vec{C}_{m_n}^Z(t_0)=(d_{m_n}^R(t_0), \phi_{A,m_n}^R(t_0), \phi_{E,m_n}^R(t_0))$, where $d_{m_n}^X(t_0)$, $\phi_{A,m_n}^X(t_0)$ and $\phi_{E,m_n}^X(t_0)$ denote a distance, an azimuth angle, and an elevation angle of the m-th sub-path in the n-th cluster at the transmitter side or the receiver side, respectively, $X \in \{T, R\}$ denotes the transmitter side and the receiver side.

In S402, in the multi-bounce channel model, delays of sub-paths in the cluster at the initial time instant are calculated by $$\tau_{qp,m_n}(t_0) = \frac{(d_{p,m_n}^T(t_0) + d_{q,m_n}^R(t_0))}{c} + \tilde{\tau}_{m_n}(t_0),$$

where $\tilde{\tau}_{m_n}$ denotes a delay of virtual links between $\vec{C}_{m_n}^A$ and $\vec{C}_{m_n}^Z$, $d_{p,m_n}^T(t_0)$ denotes a distance between $A_p^T$ and $C_{m_n}^A$ at the time instant $t_0$, and $d_{q,m_n}^R(t_0)$ denotes a distance between $A_q^R$ and $C_{m_n}^Z$, at the time instant $t_0$, $$\tilde{\tau}_{m_n}(t_0) = \frac{\tilde{d}_{m_n}(t_0)}{c} + \tau_{link}(t_0),$$

$\tilde{d}_{m_n}(t_0)$ denotes a distance between the first-bounce cluster and the last-bounce cluster, $\tau_{link}$ denotes a non-negative variable following an exponential distribution.

In S403, in (ultra-)massive MIMO scenarios, a sub-paths power $P_{qp,m_n,f_c}(t)$ in the clusters is varied along a time axis and an array axis, and the sub-paths power is commonly modeled as a lognormal process varying with time and a lognormal process varying with the array, a non-normalized sub-paths power $P'_{qp,m_n,f_c}(t)$ in the clusters is:

$$P'_{qp,m_n,f_c}(t) = \underbrace{\exp\left(-\tau_{qp,m_n}(t)\frac{r_\tau - 1}{r_\tau DS}\right)10^{-\frac{Z_n}{10}}}_{\text{The time domain}} \cdot \underbrace{\xi_n(p, q)}_{\text{The space domain}},$$

where $Z_n$ denotes a per cluster shadowing term IN dB, $r_\tau$ denotes a delay distribution proportionality factor, $\xi_n(p, q)$ denotes a two-dimensional spatial lognormal process for simulating smooth power variations over antenna arrays.

In wide bandwidth scenarios, the power value is multiplied by $$\left(\frac{f}{f_c}\right)^{\gamma_{m_n}}$$

in the frequency domain by taking frequency domain non-stationary characteristics into account, where $\gamma_{m_n}$ is a frequency-dependent constant factor, eventually, the ultimate power $P_{qp,m_n,f_c}(t)$ of the sub-paths in the clusters is obtained by normalizing the powers of all clusters; if the clusters are newly generated, $\tau_{qp,m_n}(t)$ is substituted with $\tau_{qp,m_n}(t_0)$ to obtain the initial power of the m-th sub-path in the n-th cluster between $A_p^T$ and $A_q^R$.

In S404, for the survived clusters, small-scale parameters such as the powers and the delays of the sub-paths in the clusters at different time instants are required to be updated. For the trajectory segment at the time instant $t_1$, that is, at the subsequent time instant after the clusters are generated, a coordinate of the p-th transmitter antenna $A_p^T$ is:

$$\vec{A}_p^T(t_1) = \vec{A}_p^T(t_0) + v^T(t_1 - t_0) \cdot \begin{bmatrix} \cos\alpha_A^T \cdot \cos\alpha_E^T \\ \sin\alpha_A^T \cdot \cos\alpha_E^T \\ \sin\alpha_E^T \end{bmatrix}^T,$$

where a coordinate $\vec{A}_p^T(t_0)$ of the p-th transmitter antenna at the initial time instant is calculated by $$\vec{A}_p^T(t_0) = \vec{A}_1^T(t_0) + (p-1) \cdot \delta_T \cdot \begin{bmatrix} \cos\beta_A^T \cdot \cos\beta_E^T \\ \sin\beta_A^T \cdot \cos\beta_E^T \\ \sin\beta_E^T \end{bmatrix},$$

$\vec{C}_{m_n}^A(t_1)$ can be calculated by $$\vec{C}_{m_n}^A(t_1) = \vec{C}_{m_n}^A(t_0) + v^{A_n}(t_1 - t_0) \cdot \begin{bmatrix} \cos\alpha_A^{A_n} \cdot \cos\alpha_E^{A_n} \\ \sin\alpha_A^{A_n} \cdot \cos\alpha_E^{A_n} \\ \sin\alpha_E^{A_n} \end{bmatrix}^T.$$

The distance from $A_p^T$ to the first-bounce cluster $C_{m_n}^A$ can be obtained by calculating $d_{p,m_n}^T(t_1) = \|\vec{C}_{m_n}^A(t_1) - \vec{A}_p^T(t_1)\|$ at the time instant $t_1$, similarly, the distance $d_{q,m_n}^R(t_1)$ from $A_q^Z$ to $C_{m_n}^Z$ is obtained. A delay of the sub-path in the clusters at the time instant $t_1$ is $\tau_{qp,m_n}(t_1) = (d_{p,m_n}^T(t_1) + d_{q,m_n}^R(t_1))/c + \tilde{\tau}_{m_n}$; $\tau_{qp,m_n}(t)$ and $P_{qp,m_n}(t)$ are obtained by using geographical locations of the transmitter, the receiver, and the scatterer at a previous time instant, ($t = t_2, t_3, \ldots$).

In S5, the large-scale parameters and the small-scale parameters are updated according to movements of the transceiver and birth-death processes of the clusters; and new channel coefficients are generated.

A space-time-frequency non-stationarity of the model is mainly reflected in two aspects, one is parameters of space-time-frequency variations, and another is the birth-death processes of the clusters in a space-time-frequency domain, the number of clusters at the time instant t is calculated as follows:

$$N_{qp}(t) = N_{surv}(t) + N_{new}(t),$$

where $N_{qp}(t)$ denotes the number of the clusters, $N_{surv}(t)$ denotes the number of survived clusters determined by a survived probability $P_{surv}(\Delta t, \Delta r, \Delta f)$ of the clusters, $N_{new}(t)$ denotes the number of newly generated clusters following the Poisson distribution with a mean value $E[N_{new}(t)]$, $\lambda_G$ is defined as a birth rate of the clusters, $\lambda_R$ is defined as a combination rate (death rate) of the clusters. In order to model a space-time-frequency evolution process of the clusters more accurately, two types of sampling intervals are introduced, one type is a time domain sampling interval $\Delta t$, a frequency domain sampling interval $\Delta f$ and a space domain (array domain) sampling interval $\Delta r$, and channel parameters are updated continuously, another type is described by $\Delta t_{BD}$, $\Delta f_{BD}$ and $\Delta r_{BD}$ that are integer multiples of corresponding $\Delta t$, $\Delta f$ and $\Delta r$, and during the birth-death processes and the evolution processes of the clusters occurred at sampling points, survived probabilities of the transmitter side and receiver side clusters along the array axis and time axis are as follows:

$$p_{surv}^T(\Delta t_{BD}, \delta_p) = e^{-\lambda_R \left((\epsilon_1^T)^2 + (\epsilon_2^T)^2 + 2\epsilon_1^T \epsilon_2^T \cos(\alpha_A^T - \beta_A^T)\right)^{1/2}}$$

$$P_{surv}^R(\Delta t_{BD}, \delta_q) = e^{-\lambda_R \left((\epsilon_1^R)^2 + (\epsilon_2^R)^2 + 2\epsilon_1^R \epsilon_2^R \cos(\alpha_A^R - \beta_A^R)\right)^{1/2}}$$

where $\epsilon_1^T = \dfrac{\delta_p \cos \beta_E^T}{D_c^A}\left(\epsilon_1^R = \dfrac{\delta_q \cos \beta_E^R}{D_c^A}\right)$ and $\epsilon_2^T = \dfrac{v^T \Delta t_{BD}}{D_c^S}\left(\epsilon_2^R = \dfrac{v^R \Delta t_{BD}}{D_c^S}\right)$ denote position differences of the transmitter antenna element and the receiver antenna element on the array axis and the time axis, respectively, $D_c^A$ and $D_c^S$ denote scenario-dependent factors on the array axis and the time axis, respectively, a joint survived probability of the transmitter side and receiver side clusters is represented as follows:

$$P_{surv}(\Delta t_{BD}, \delta_p, \delta_q) = P_{surv}^T(\Delta t_{BD}, \delta_p) P_{surv}^R(\Delta t_{BD}, \delta_q).$$

The average number of the newly generated clusters is:

$$E(N_{new}) = \frac{\lambda_G}{\lambda_R}(1 - P_{surv}(\Delta t_{BD}, \Delta r_{BD})).$$

When wide bandwidth scenarios are studied, the birth-death processes of the clusters also exist on a frequency axis, and a survival probability of the clusters on the frequency axis is:

$$P_{surv}(\Delta f_{BD}) = e^{-\lambda_R \frac{F(\Delta f_{BD})}{D_c^f}},$$

where $F(\Delta f_{BD})$ and $D_c^f$ are determined by channel measurements, $D_c^f$ denotes a scenario-dependent factor on the frequency axis, in summary, when the birth-death processes of the space-time-frequency domain clusters are taken into account, the survived probability of the clusters is:

$$P_{surv}(\Delta t_{BD}, \Delta r_{BD}, \Delta f_{BD}) = P_{surv}^T(\Delta t_{BD}, \delta_p) P_{surv}^R(\Delta t_{BD}, \delta_q) P_{surv}(\Delta f_{BD}).$$

The average number of the newly generated clusters is:

$$E(N_{new}) = \frac{\lambda_G}{\lambda_R}(1 - P_{surv}(\Delta t_{BD}, \Delta r_{BD}, \Delta f_{BD})).$$

In UHST scenarios, by taking account of a waveguide effect and an impact of tube wall roughness on channels in vacuum tube UHST scenarios, the average number of the newly generated clusters is:

$$E(N_{new}) = \frac{\lambda_G}{\lambda_R}(1 - P_{surv}(\Delta t_{BD}, \Delta r_{BD}, \Delta f_{BD}))\left(1 - \frac{D_{qp}(t)}{D}\right) \cdot \frac{\rho_s}{\rho_{s_0}}$$

$$\rho_s = e^{\left\{-8\left(\frac{\pi \sigma_h \cos\left(E\left[\phi_{E,m_n}^T\right]\right)}{\lambda}\right)^2\right\}}$$

where $D_{qp}(t)$ denotes a linear distance between the transmitter side and the receiver side at the time instant t, $D$ denotes an initial distance between the transmitter side and the receiver side, $\rho_s$ denotes a scattering coefficient of the tube wall, and $\rho_{s_0}$ denotes a scattering coefficient when the roughness of $\sigma_h = 0$.

Based on the above method and the geometric relationship between the transmitter, the receiver and the scatterers, the small-scale parameters of different antenna pairs can be obtained, so that all parameter values in the channel matrix can be obtained. The modeling method and corresponding parameters for the model are summarized in the following table.

TABLE 1

| | | | |
|---|---|---|---|
| Model parameters and modeling methods | | | |
| Scenarios | | Channel Characteristics | Model parameters and modeling methods |
| All spectra | MmWave/ THz Channel | High delay resolution | Modeling the delay of sub-paths in the clusters ($\tau_{qp, m_n}(t)$) |
| | | Frequency domain non-stationarity | 1) Introducing birth-death process of the cluster in frequency domain 2) Power varying with frequency($P_{qp,m_n,f_c}(t)$) |
| | | Atmosphere absorption | Considering the impact of oxygen absorption at mmWave band/molecular absorption at THz band on the received power |

TABLE 1-continued

Model parameters and modeling methods

| Scenarios | | Channel Characteristics | Model parameters and modeling methods |
|---|---|---|---|
| | VLC Channel | Blockage effect | Considering the impact of blockage effect (BL) on the received power |
| | | No multipath rapid fading and negligible Doppler effect | Merely modeling powers ($P_{qp,m_{n,f_c}}(t)$) and propagation delays ($\tau_{qp, m_n}(t)$) |
| | | 3D rotational receiver side | The angles ($\beta_A^R(t)$, $\beta_E^R(t)$) of the normal vector at the receiver are time-variant |
| | | Special LED radiation mode | Supporting all LED radiation modes ($F_{PHPV}(\theta_{PHPV}, E^T, \theta_{PHPV, A}^T)$) |
| | | Wavelength dependence | Modeling the effective reflectance parameters of clusters ($\Gamma_{PHPV, n}$) |
| Global-coverage scenarios | Satellite Channel | Ionosphere Faraday effect | Modeling Faraday rotation matrix ($F_r$) |
| | | Rain attenuation | Modeling the rain attenuation (RA) |
| | UAV Channel | 3D motion | The motion having elevation directions ($\alpha_E^T(t)$, $\alpha_E^R(t)$, $\alpha_E^{An}(t)$, $\alpha_E^{Zn}(t)$) |
| | | Channel difference relate to the UAV height | Large-scale parameter generation following logarithmic Gaussian distribution, and the mean value and standard deviation of the distribution being highly correlated with UAVs height |
| | Maritime Channel | Location dependence | The LoS path component and multipath components of both rough ocean surface and evaporation duct over the sea surface being modeled as $h_{qp, f_c}^{LoS}(t, \tau)$, $h_{qp, f_c}^{NLoS1}(t, \tau)$ and $h_{qp, f_c}^{NLoS2}(t, \tau)$, and the power coefficients $K_R$, $S_1$ and $S_1$ being used to manipulate the disappearance and appearance of corresponding parts with variations of distances between two ships |
| | | 3D fluctuation of sea waves | Modeling the ship's 3D trajectory using the classic Pierson-Moskowitz model |
| Full-application scenarios | V2V Channel | Arbitrary trajectory | The velocity of the transceiver and the cluster being modeled respectively, and the velocity size and direction being variable ($\vec{v}^T(t)$, $\vec{v}^R(t)$, $\vec{v}^{An}(t)$, $\vec{v}^{Zn}(t)$) |
| | | Multi-mobility property | |
| | (U)HST Channel | Large Doppler shift | Doppler shift ($v_{D, qp, m_n}(t)$) being time-variant |
| | | Time domain non-stationarity | 1) Introducing birth-death process of the cluster in time domain 2) Channel parameters being time-variant |
| | | Waveguide effect | The number of clusters ($N_{qp}(t)$) is modeled as being affected by the vacuum tube waveguide effect |
| | (U)massive MIMO Channel | Spherical wavefront characteristics | Modeling the arrival angle and departure angle of each antenna separately ($\phi_{A, m_n}^T(t)$, $\phi_{E, m_n}^T(t)$, $\phi_{A, m_n}^R(t)$, and $\phi_{E, m_n}^R(t)$) |
| | | Space domain non-stationarity | 1) Introducing birth-death process of the cluster in array domain 2) Introducing a variation ($\xi_n(p, q)$) along the array axis in power $P_{qp, m_{n,f_c}}(t)$) |
| | RIS Channel | Cascaded sub-channel | Introducing $H_{IR}$, $H_{TI}$ & $H_{TR}$ and modeling the three sub-channels respectively |

TABLE 1-continued

Model parameters and modeling methods

| Scenarios | Channel Characteristics | Model parameters and modeling methods |
|---|---|---|
| IIoT Channel Common Characteristics | Phase control | Introducing the phase-shift diagonal matrix $\Phi$ to implement intelligent control of channel environment |
| | Dense multipath component | Modeling the dense multipath ($h_{qp,f_c}^{DMC}(t, \tau)$) |
| | Spatial consistency | Using the SoS method to generate large-scale parameters with spatial consistency |
| | Multi-frequency correlation | 1) PL being frequency dependent; 2) In large-scale parameters, DS and angle spreads being related to frequency; 3) Power ($P_{qp,m_n,f_c}(t)$) being frequency dependent |

3. Model Simplification

By adjusting the parameters, the 6GPCM can be simplified into multiple dedicated channel models, as illustrated in Table 2.

TABLE 2

Simplified summary table of 6GPCM

| Scenarios supported by 6GPCM | Simplified model | Parameter Adjustments |
|---|---|---|
| Multi-link | Single-link | 1) $N_T = N_R = 1$ |
| Multi-frequency | Single-frequency | 1) $h_{qp,f_c}(t, \tau) = h_{qp}(t, \tau)$<br>2) Multi-band correlation being not considered in power $P_{qp,m_n,f_c}(t)$ calculation |
| All spectra | Sub-6 GHz | 1) OL = 1, BL = 1<br>2) $M_n(t) = 1$, each cluster merely having one scatterer, and modeling the path is modeled: $\tau_{m_n} = \tau_n$, $P_{m_n} = P_n$, and the like<br>3) $P_{surv}(\Delta f_{BD}) = 1$, $\gamma_{m_n} = 0$ |
| | MmWave/THz + massive MIMO | 1) Single-link; single-frequency<br>2) $RA = 1, \mu = 1, F_r = \begin{bmatrix} 1 & 0 \\ 0 & 1 \end{bmatrix}, M_n(t) = M_n$<br>3) The large-scale parameters following independent lognormal distributions. |
| | Indoor + VLC | 1) Single-link; single-frequency; using single-cluster model;<br>2) OL = 1,<br>$RA = 1, \mu = 1, F_r = \begin{bmatrix} 1 & 0 \\ 0 & 1 \end{bmatrix}, M_n(t) = M_n$<br>3) The transmitter side being a stationary LED array at the $p_H$-th row and the $p_V$-th column, $v^T = 0$, $M_T = p_H \times p_V$ and the row and column intervals being $\delta_H$ and $\delta_V$ respectively; the receiver side being a photodiode that can move and rotate, $M_R = 1$<br>4) $h_{p_{VPH}}(t, \tau) = h_{p_{VPH}}^{LoS}(t, \tau) + h_{p_{VPH}}^{NLoS}(t, \tau) = P_{p_{VPH}}^{LoS}(t) \cdot \delta(\tau - \tau_{p_{VPH}}^{LoS}(t)) + P_{p_{VPH},m_n}^{NLoS}(t) \cdot \delta(\tau - \tau_{p_{VPH},m_n}(t))$<br>5) $P_{surv}(\Delta f_{BD}) = P_{surv}(\Delta t_{BD}) = 1$, $\gamma_{m_n} = 0$<br>Array domains evolving in rows and columns. |
| Global-coverage scenarios | LEO communication channel | 1) Single-link; single-frequency<br>2) OL = 1, BL = 1, $\mu = 1$, $M_n(t) = M_n$<br>3) $P_{surv}(\Delta f_{BD}) = 1$, $\gamma_{m_n} = 0$<br>4) $P_{surv}(\Delta r_{BD}) = 1$, $\xi_n(p, q) = 1$ |
| | UAV communication channel | 1) Single-link; single-frequency<br>2) OL = 1, BL = 1,<br>$RA = 1, \mu = 1, F_r = \begin{bmatrix} 1 & 0 \\ 0 & 1 \end{bmatrix}, M_n(t) = M_n$<br>3) $P_{surv}(\Delta f_{BD}) = 1$, $\gamma_{m_n} = 0$<br>4) $\xi_n(p, q) = 1$ |

TABLE 2-continued

Simplified summary table of 6GPCM

| Scenarios supported by 6GPCM | Simplified model | Parameter Adjustments |
|---|---|---|
|  | Maritime communication channel | 1) Single-link; single-frequency<br>2) OL = 1, BL = 1, $RA = 1, \mu = 1, F_r = \begin{bmatrix} 1 & 0 \\ 0 & 1 \end{bmatrix}, M_n(t) = M_n$<br>3) $h_{qp,f_c}(t, \tau) = \sqrt{\dfrac{K_R(t)}{K_R(t)+1}} h_{qp,f_c}^{LoS}(t, \tau) + \sqrt{\dfrac{S_1}{K_R(t)+1}} h_{qp,f_c}^{NLoS_1}(t, \tau) + \sqrt{\dfrac{S_2}{K_R(t)+1}} h_{qp,f_c}^{NLoS_2}(t, \tau)$<br>4) $P_{surv}(\Delta f_{BD}) = 1, \gamma_{m_n} = 0$<br>5) $\xi_n(p, q) = 1$ |
| Full-application scenarios | V2V communication channel | 1) Single-link; single-frequency<br>2) $OL = 1, BL = 1, RA = 1, \mu = 1, F_r = \begin{bmatrix} 1 & 0 \\ 0 & 1 \end{bmatrix}$,<br>3) $P_{surv}(\Delta f_{BD}) = 1, \gamma_{m_n} = 0$<br>4) $P_{surv}(\Delta r_{BD}) = 1, \xi_n(p, q) = 1$ |
|  | MmWave + UHST | 1) Single-link; single-frequency; clusters are distributed on the wall of the vacuum tube<br>2) $RA = 1, \mu = 1, F_r = \begin{bmatrix} 1 & 0 \\ 0 & 1 \end{bmatrix}, M_n(t) = M_n$<br>$M_n(t) = M_n$<br>3) $v^{A_n} = 0, v^{Z_n} = 0, v^T = 0$<br>4) $P_{surv}(\Delta f_{BD}) = 1, \gamma_{m_n} = 0$<br>5) $P_{surv}(\Delta r_{BD}) = 1, \xi_n(p, q) = 1$ |
|  | ultra-massive MIMO | 1) Single-frequency<br>2) $RA = 1, \mu = 1, F_r = \begin{bmatrix} 1 & 0 \\ 0 & 1 \end{bmatrix}, M_n(t) = M_n$ |
|  | RIS communication channel | 1) Single-link; single-frequency<br>2) $OL = 1, BL = 1, RA = 1, \mu = 1, F_r = \begin{bmatrix} 1 & 0 \\ 0 & 1 \end{bmatrix}$,<br>$M_n(t) = M_n$<br>3) $P_{surv}(\Delta f_{BD}) = P_{surv}(\Delta t_{BD}) = 1, \gamma_{m_n} = 0$<br>Array domains evolving in rows and columns. |
|  | IIoT communication channel | 1) Single-link; single-frequency<br>2) $RA = 1, \mu = 1,$<br>$F_r = \begin{bmatrix} 1 & 0 \\ 0 & 1 \end{bmatrix}$,<br>3) $h_{qp,f_c}(t, \tau) = \sqrt{\dfrac{K_R(t)}{K_R(t)+1}} h_{qp,f_c}^{LoS}(t, \tau) + \sqrt{\dfrac{1}{K_R(t)+1}} \left( h_{qp,f_c}^{NLoS_{SC}}(t, \tau) + h_{qp,f_c}^{NLoS_{DMC}}(t, \tau) \right)$<br>4) $P_{surv}(\Delta f_{BD}) = 1, \gamma_{m_n} = 0$ |
| Pervasive | B5GCM | 1) Single-link; single-frequency<br>2) RA = 1,<br>$F_r = \begin{bmatrix} 1 & 0 \\ 0 & 1 \end{bmatrix}$,<br>$M_n(t) = M_n$<br>3) $P_{surv}(\Delta f_{BD}) = 1$<br>4) The large-scale parameters following independent lognormal distribution |

The present disclosure is described in detail in combination with the drawings and specific embodiments. The embodiments are implemented on the premise of the technical solutions of the present disclosure, and the specific embodiments and specific operation processes are given, but the protection scope of the present disclosure is not limited to the following embodiments.

By taking the scenario of the ultra-massive MIMO at millimeter band as an example, a channel matrix of a 6GPCM is represented as:

$$H = [PL \cdot SH \cdot BL \cdot AL]^{1/2} \cdot H_s,$$

where PL denotes path loss, SH denotes shadowing, BL denotes blockage loss, AL denotes atmospheric gas absorption loss, $$H_s = [h_{qp,f_c}(t, \tau)]_{M_R \times M_T},$$

where $M_T$ ($M_R$) denotes the number of antenna elements in the transmitter (receiver) antenna array, $h_{qp,f_c}(t, \tau)$ denotes a channel impulse response between $A_p^T$ and $A_q^R$, which is represented by the superposition of an LoS component $h_{qp,f_c}^{LoS}(t, \tau)$ and a NLoS component $h_{qp,f_c}^{NLoS}(t, \tau)$:

$$h_{qp,f_c}(t, \tau) = \sqrt{\frac{K_R(t)}{K_R(t)+1}} h_{qp,f_c}^{LoS}(t, \tau) + \sqrt{\frac{1}{K_R(t)+1}} h_{qp,f_c}^{NLoS}(t, \tau),$$

where $K_R(t)$ denotes a Rice factor, $h_{qp,f_c}^{LoS}(t, \tau)$ and $h_{qp,f_c}^{NLoS}(t, \tau)$ are respectively represented as follows $$h_{qp,f_c}^{LoS}(t, \tau) = \begin{bmatrix} F_{q,f_c,V}(\phi_{E,L}^R(t), \phi_{A,L}^R(t)) \\ F_{q,f_c,H}(\phi_{E,L}^R(t), \phi_{A,L}^R(t)) \end{bmatrix}^T \begin{bmatrix} e^{j\theta_L^{VV}} & 0 \\ 0 & -e^{j\theta_L^{HH}} \end{bmatrix}$$

$$F_r \begin{bmatrix} F_{p,f_c,V}(\phi_{E,L}^T(t), \phi_{A,L}^T(t)) \\ F_{p,f_c,H}(\phi_{E,L}^T(t), \phi_{A,L}^T(t)) \end{bmatrix} e^{j2\pi f_c \tau_{qp}^L(t)} \delta(\tau - \tau_{qp}^L(t))$$

$$h_{qp,f_c}^{NLoS}(t, \tau) = \sum_{n=1}^{N_{qp}(t)} \sum_{m=1}^{M_n(t)} \begin{bmatrix} F_{q,f_c,V}(\phi_{E,m_n}^R(t), \phi_{A,m_n}^R(t)) \\ F_{q,f_c,H}(\phi_{E,m_n}^R(t), \phi_{A,m_n}^R(t)) \end{bmatrix}^T \begin{bmatrix} e^{j\theta_{m_n}^{VV}} & \sqrt{\mu \kappa_{m_n}^{-1}(t)} e^{j\theta_{m_n}^{VH}} \\ \sqrt{\kappa_{m_n}^{-1}(t)} e^{j\theta_{m_n}^{HV}} & \sqrt{\mu} e^{j\theta_{m_n}^{HH}} \end{bmatrix}$$

$$F_r \begin{bmatrix} F_{p,f_c,V}(\phi_{E,m_n}^T(t), \phi_{A,m_n}^T(t)) \\ F_{p,f_c,H}(\phi_{E,m_n}^T(t), \phi_{A,m_n}^T(t)) \end{bmatrix} \sqrt{P_{qp,m_n,f_c}(t)} e^{j2\pi f_c \tau_{qp,m_n}(t)} \delta(\tau - \tau_{qp,m_n}(t)),$$

where $\{*\}^T$ denotes a transposition operation, $f_c$ denotes a carrier frequency, $F_{p(q),f_c,V}$ and $F_{p(q),f_c,H}$ denote antenna patterns of the array element $A_p^T$ ($A_q^R$) for vertical and horizontal polarizations at different frequency bands, $\kappa_{m_n}(t)$ denotes a cross polarization power ratio, $\mu$ denotes a co-polar imbalance, $\phi_{A,m_n}^T(t)$ and $\phi_{E,m_n}^T(t)$ denote an azimuth departure angle and an elevation departure angle corresponding to the m-th sub-path from $A_1^T$ to $C_n^A$ at the time instant t, $\phi_{A,m_n}^R(t)$ and $\phi_{E,m_n}^R(t)$ denote an azimuth arrival angle and an elevation arrival angle corresponding to the m-th sub-path from $A_1^R$ to $C_n^Z$ at the time instant t, $\phi_{A,L}^T(t)$ and $\phi_{E,L}^T(t)$ denote an azimuth departure angle and an elevation departure angle corresponding to the LoS path from $A_1^T$ to $A_1^R$ at the time instant t, $\phi_{A,L}^R(t)$ and $\phi_{E,L}^R(t)$ denote an azimuth arrival angle and an elevation arrival angle corresponding to the LoS path from $A_1^T$ to $A_1^R$ at the time instant t, $\theta_L^{VV}, \theta_L^{HH}, \theta_{m_n}^{VV}, \theta_{m_n}^{VH}, \theta_{m_n}^{HV}$ and $\theta_{m_n}^{HH}$ are random phases uniformly distributed over $(0, 2\pi]$, $P_{qp,m_n,f_c}(t)$ denotes a power of the m-th sub-path in the n-th path from $A_p^T$ to $A_q^R$ at the NLoS condition, $\tau_{qp}^L(t)$ denotes a delay of the LoS path at the time instant t, $$\tau_{qp}^L(t) = \frac{\vec{d}_{qp}(t)}{c},$$

$\vec{d}_{qp}(t)$ denotes a vector distance between the transmitter antenna array $A_p^T$ and the receiver antenna array $A_q^R$ at the time instant t, c denotes a speed of light, $\tau_{qp,m_n}(t)$ denotes a delay of the m-th sub-path in the n-th path from $A_p^T$ to $A_q^R$ at the time instant t, all of the above parameters are time-varying parameters.

The detailed steps for generating channel coefficients are specifically as follows.

In S1, propagation scenarios and propagation conditions are set; the carrier frequency, the antenna type, the layout of the transceiver and the motion trajectory of the transceiver are determined.

In S2, the path loss, the shadowing, the oxygen absorption and the large scale fading of blockage effect are generated; the method mainly focuses on a modeling for the small-scale fading, and standard channel models for large scale fading are referable to the calculation of this part.

In S3, according to positions and motion conditions of the transceiver, large-scale parameters with spatial consistency of the DS and 4 angle spreads are generated.

Except SH, other corresponding large-scale parameters include DS, ASA, ASD, ESA, ESD, $K_R$ and XPR. The generation methods of large-scale parameters are the same. The delay extension DS generation is taken as an example herein and represented as the following formula:

$$DS_{f_c}(P) = DS_{\mu,f_c} + X^{DS}(P) \cdot DS_{\sigma,f_c},$$

where $P=(P^T, P^R)$ is composed of transceiver position vectors, $P^T(t)=(x^T(t), y^T(t), z^T(t))$ and $P^R(t)=(x^R(t), y^R(t), z^R(t))$ denote a coordinate vector at the transmitter side and a coordinate vector at the receiver side, respectively, and initial values of which are generated according to simulation environments and requirements; $X^{DS}(P)$ denotes a normal distribution variable generated by the sine wave superposition method and following the spatial consistency with the mean value of 0 and the variance of 1, $DS_{\mu,f_c}$ denotes a mean value for DS in a frequency $f_c$, and $DS_{\sigma,f_c}$ denotes a variance of DS in the frequency $f_c$, configuration values for $DS_{\sigma,f_c}$ are divided into three types according to a height $h_{UT}$ of a user terminal; the values in this embodiment can refer to Tables 7.5-6 in the 3GPP TR 38.901 standardization document. All 8 large-scale parameters are independently generated by this method, values for all large-scale parameters with spatial consistency in a logarithm domain can be obtained by multiplying a cross-correlation matrix among the large-scale parameters, subsequently values in the logarithm domain are required to be converted into a linear domain; so that the large-scale parameters of the channel are obtained.

In S4, scatterers following an ellipsoid Gaussian scattering distribution are generated, delays, angles and powers of the clusters are calculated according to geographical location information of the transceiver and the scatterers, and channel coefficients are generated.

In S401, positions of the scatterers are obtained by using an ellipsoid Gaussian scattering distribution, the scatterers in the n-th cluster centered on $(\bar{d}_n^X, \bar{\phi}_{E,n}^X, \bar{\phi}_{A,n}^X)$ follow a Gaussian distribution with standard deviations of $\sigma_x^X, \sigma_y^X$ and $\sigma_z^X$ on three axes respectively; after obtaining the positions of the scatterers, the positions of the scatterers are converted into spherical coordinates; positions $\vec{C}_{m_n}^A(t_0)$ and $\vec{C}_{m_n}^Z(t_0)$ of the scatterers in the n-th cluster corresponding to a position of a first transmitter antenna $\vec{A}_1^T(t_0)$ and a position of a first receiver antenna $\vec{A}_1^R(t_0)$ are represented as $\vec{C}_{m_n}^A(t_0) = (d_{m_n}^T(t_0), \phi_{A,m_n}^T(t_0), \phi_{E,m_n}^T(t_0))$ and $\vec{C}_{m_n}^Z(t_0) = (d_{m_n}^R(t_0), \phi_{A,m_n}^R(t_0), \phi_{E,m_n}^R(t_0))$, where $d_{m_n}^X(t_0)$, $\phi_{A,m_n}^X(t_0)$ and $\phi_{E,m_n}^X(t_0)$ denote a distance, an azimuth angle, and an elevation angle of the m-th sub-path of the n-th cluster at the transmitter side or the receiver side, respectively, $X \in \{T, R\}$ denotes the transmitter side and the receiver side.

In S402, in the multi-bounce channel model, delays of sub-paths in the cluster at the initial time instant are calculated by $$\tau_{qp,m_n}(t_0) = \frac{(d_{p,m_n}^T(t_0) + d_{q,n_n}^R(t_0))}{c} + \tilde{\tau}_{m_n}(t_0),$$

where $\tilde{\tau}_{m_n}$ denotes a delay of virtual links between $\vec{C}_{m_n}^A$ and $\vec{C}_{m_n}^Z$, $d_{p,m_n}^T(t_0)$ denotes a distance between $A_p^T$ and $C_{m_n}^A$ at the time instant $t_0$, and $d_{q,m_n}^R(t_0)$ denotes a distance between $A_q^R$ and $C_{m_n}^Z$ at the time instant $t_0$, $$\tilde{\tau}_{m_n}(t_0) = \frac{\tilde{d}_{m_n}(t_0)}{c} + \tau_{link}(t_0), \tilde{d}_{m_n}(t_0)$$

denotes a distance between the first-bounce cluster and the last-bounce cluster, $\tau_{link}$ denotes a non-negative variable following an exponential distribution.

In S403, in (ultra-)massive MIMO scenarios, a sub-paths power $P_{qp,m_n f_c}(t)$ in the clusters is varied along a time axis, a frequency axis and an array axis, and the sub-paths power is commonly modeled as a lognormal process varying with time and a lognormal process varying with the array, a non-normalized sub-paths power $P'_{qp,m_n f_c}(t)$ in the clusters is:

$$P'_{qp,m_n,f_c}(t) = \underbrace{\exp\left(-\tau_{qp,m_n}(t)\frac{r_\tau - 1}{r_\tau DS}\right)10^{-\frac{Z_n}{10}}}_{\text{The time domain}} \cdot \underbrace{\xi_n(p, q)}_{\text{The space domain}},$$

where $Z_n$ denotes a per cluster shadowing term in dB, $r_\tau$ denotes a delay distribution proportionality factor, $\xi_n(p, q)$ denotes a two-dimensional spatial lognormal process for simulating smooth power variations over antenna arrays.

At the mmWave band, in wide bandwidth scenarios, the power value is multiplied by $$\left(\frac{f}{f_c}\right)^{\gamma_{m_n}}$$

in the frequency domain by taking frequency domain non-stationary characteristic into account, where $\gamma_{m_n}$ is a frequency-dependent constant factor, eventually, the ultimate power $P_{qp,m_n f_c}(t)$ of the sub-paths in the clusters is obtained by normalizing the powers of all clusters; if the cluster are newly generated, $\tau_{qp,m_n}(t)$ is substituted with $\tau_{qp,m_n}(t_0)$ to obtain the initial power of the m-th sub-path in the n-th cluster between $A_p^T$ and $A_q^R$.

In S404, for the survived clusters, small-scale parameters such as the powers and the delays of the sub-paths in the clusters at different time instants are required to be updated. For the trajectory segment at the time instant $t_1$, that is, at the subsequent time instant after the clusters are generated, a coordinate of the p-th transmitter antenna $A_p^T$ is:

$$\vec{A}_p^T(t_1) = \vec{A}_p^T(t_0) + v^T(t_1 - t_0) \cdot \begin{bmatrix} \cos\alpha_A^T \cdot \cos\alpha_E^T \\ \sin\alpha_A^T \cdot \cos\alpha_E^T \\ \sin\alpha_E^T \end{bmatrix}^T,$$

where a coordinate $\vec{A}_p^T(t_0)$ of the p-th transmitter antenna at the initial time instant is calculated by $$\vec{A}_p^T(t_0) = \vec{A}_1^T(t_0) + (p-1) \cdot \delta_T \cdot \begin{bmatrix} \cos\beta_A^T \cdot \cos\beta_E^T \\ \sin\beta_A^T \cdot \cos\beta_E^T \\ \sin\beta_E^T \end{bmatrix}^T, \vec{C}_{m_n}^A(t_1)$$

can be calculated by $$\vec{C}_{m_n}^A(t_1) = \vec{C}_{m_n}^A(t_0) + v^{A_n}(t_1 - t_0) \cdot \begin{bmatrix} \cos\alpha_A^{A_n} \cdot \cos\alpha_E^{A_n} \\ \sin\alpha_A^{A_n} \cdot \cos\alpha_E^{A_n} \\ \sin\alpha_E^{A_n} \end{bmatrix}^T.$$

The distance from $A_p^T$ to the first-bounce cluster $C_{m_n}^A$ can be obtained by calculating $d_{p,m_n}^T(t_1) = \|\vec{C}_{m_n}^A(t_1) - \vec{A}_p^T(t_1)\|$ at the time instant $t_1$, similarly, the distance $d_{q,m_n}^R(t_1)$ from $A_q^Z$ to $C_{m_n}^Z$ is obtained. A delay of the sub-path in the clusters at the time instant $t_1$ is $\tau_{qp,m_n}(t_1) = (d_{p,m_n}^T(t_1) + d_{q,m_n}^R(t_q))/c + \tilde{\tau}_{m_n}$; $\tau_{qp,m_n}(t)$ and $P_{qp,m_n}(t)$ are obtained by using geographical locations of the transmitter, the receiver, and the scatterer at a previous time instant, $(t=t_2, t_3, \ldots)$.

In S5, the large-scale parameters and the small-scale parameters are updated according to the movements of the transceiver and the birth-death processes of the clusters; and new channel coefficients are generated.

A space-time-frequency non-stationarity of the model is mainly reflected in two aspects, one is parameters of space-time-frequency variations, and another is the birth-death processes of the clusters in a space-time-frequency domain, the number of clusters at the time instant t is calculated as follows:

$$N_{qp}(t) = N_{surv}(t) + N_{new}(t),$$

where $N_{qp}(t)$ denotes the number of the clusters, $N_{surv}(t)$ denotes the number of survived clusters, determined by a survived probability $P_{surv}(\Delta t, \Delta r, \Delta f)$ of the clusters, $N_{new}(t)$ denotes the number of newly generated clusters following the Poisson distribution with a mean value $E[N_{new}(t)]$, $\lambda_G$ is defined as a birth rate of the clusters, $\lambda_R$ is defined as a combination rate (death rate) of the clusters. In order to model a space-time-frequency evolution process of the clusters more accurately, two types of sampling intervals are introduced, one type is a time domain sampling interval $\Delta t$, a frequency domain sampling interval $\Delta f$ and a space domain (array domain) sampling interval $\Delta r$, and channel parameters are updated continuously, another type is described by $\Delta t_{BD}$, $\Delta f_{BD}$ and $\Delta r_{BD}$ that are integer multiples of corresponding $\Delta t$, $\Delta f$ and $\Delta r$, and during the birth-death processes and the evolution processes of the clusters occurred at sampling points, survived probabilities of the transmitter side and receiver side clusters along the array axis and time axis are as follows:

$$P_{surv}^T(\Delta t_{BD}, \delta_p) = e^{-\lambda_R\left((\epsilon_1^T)^2 + (\epsilon_2^T)^2 + 2\epsilon_1^T\epsilon_2^T\cos(\alpha_A^T - \beta_A^T)\right)^{1/2}}$$

$$P_{surv}^R(\Delta t_{BD}, \delta_q) = e^{-\lambda_R\left((\epsilon_1^R)^2 + (\epsilon_2^R)^2 + 2\epsilon_1^R\epsilon_2^R\cos(\alpha_A^R - \beta_A^R)\right)^{1/2}}$$

where $\epsilon_1^T = \frac{\delta_p \cos\beta_E^T}{D_c^A}\left(\epsilon_1^R = \frac{\delta_q \cos\beta_E^R}{D_c^A}\right)$ and $\epsilon_2^T = \frac{v^T \Delta t_{BD}}{D_c^S}\left(\epsilon_2^R = \frac{v^R \Delta t_{BD}}{D_c^S}\right)$ denote position differences of the transmitter antenna element and the receiver antenna element on the array axis and the time axis, respectively, $D_c^A$ and $D_c^S$ denote scenario-dependent factors on the array axis and the time axis, respectively, a joint survived probability of the transmitter side and receiver side clusters is represented as follows:

$$P_{surv}(\Delta t_{BD}, \delta_p, \delta_q) = P_{surv}^T(\Delta t_{BD}, \delta_p) P_{surv}^R(\Delta t_{BD}, \delta_q).$$

The average number of the newly generated clusters is:

$$E(N_{new}) = \frac{\lambda_G}{\lambda_R}(1 - P_{surv}(\Delta t_{BD}, \Delta r_{BD})).$$

When wide bandwidth scenarios are studied, the birth-death processes of the clusters also exist on a frequency axis, and a survived probability of the clusters on the frequency axis is:

$$P_{surv}(\Delta f_{BD}) = e^{-\lambda_R \frac{F(\Delta f_{BD})}{D_c^f}},$$

where $F(\Delta f_{BD})$ and $D_c^f$ are determined by channel measurements, $D_c^f$ denotes a scenario-dependent factor on the frequency axis. In summary, when the birth-death processes of the space-time-frequency domain clusters are taken into account, the survived probability of the clusters is:

$$P_{surv}(\Delta t_{BD}, \Delta r_{BD}, \Delta f_{BD}) = P_{surv}^T(\Delta t_{BD}, \delta_p) P_{surv}^R(\Delta t_{BD}, \delta_q) P_{surv}(\Delta f_{BD}).$$

The average number of the newly generated clusters is:

$$E(N_{new}) = \frac{\lambda_G}{\lambda_R}(1 - P_{surv}(\Delta t_{BD}, \Delta r_{BD}, \Delta f_{BD})).$$

Based on the above method and the geometric relationship between the transmitter, the receiver and the scatterers, the small-scale parameters of different antenna pairs can be obtained, so that all parameter values in the channel matrix can be obtained.

What is claimed is:

1. A method for transmitting and receiving signals using a transceiver including pervasively modeling 6G channels configured for frequency bands including sub-6 GHz, millimeter wave, terahertz, and optical wireless frequency bands and scenarios including global-coverage scenarios and full-application scenarios, wherein,
a channel matrix of the pervasively modeling 6G channels is represented as:

$$H = [PL \cdot SH \cdot BL \cdot WE \cdot AL]^{1/2} \cdot H_s,$$

where PL, SH, BL, WE, AL denote large-scale fadings, PL denotes a path loss, SH denotes a shadowing, BL denotes a blockage loss, AL denotes an atmospheric gas absorption loss, WE denotes a weather effect loss, $H_s$ denotes a small-scale fading;
the small-scale fading channel matrix $H_s$ is represented as:

$$H_s = [h_{qp,f_c}(t, \tau)]_{M_R \times M_T},$$

where $M_T$ denotes a number of antenna elements in the transmitter antenna array, $M_R$ denotes a number of antenna elements in the receiver antenna array, $h_{qp,f_c}(t, \tau)$ denotes a channel impulse response between a p-th array element $A_p^T$ in the transmitter antenna array and a q-th array element $A_q^R$ in the receiver antenna array at the time instant t, which is represented as a superposition of an LoS component $h_{qp,f_c}^{LoS}(t, \tau)$ and a NLoS component $h_{qp,f_c}^{NLoS}(t, \tau)$:

$$h_{qp,f_c}(t, \tau) = \sqrt{\frac{K_R(t)}{K_R(t)+1}} h_{qp,f_c}^{LoS}(t, \tau) + \sqrt{\frac{1}{K_R(t)+1}} h_{qp,f_c}^{NLoS}(t, \tau),$$

where $K_R(t)$ denotes a Rice factor, $h_{qp,f_c}^{LoS}(t, \tau)$ and $h_{qp,f_c}^{NLoS}(t, \tau)$ are respectively represented as:

$$h_{qp,f_c}^{LoS}(t, \tau) = \begin{bmatrix} F_{q,f_c,V}(\phi_{E,L}^R(t), \phi_{A,L}^R(t)) \\ F_{q,f_c,H}(\phi_{E,L}^R(t), \phi_{A,L}^R(t)) \end{bmatrix}^T \begin{bmatrix} e^{j\theta_L^{VV}} & 0 \\ 0 & -e^{j\theta_L^{HH}} \end{bmatrix}$$

$$F_r \begin{bmatrix} F_{b,f_c,V}(\phi_{E,L}^T(t), \phi_{A,L}^T(t)) \\ F_{p,f_c,H}(\phi_{E,L}^T(t), \phi_{A,L}^T(t)) \end{bmatrix} e^{j2\pi f_c \tau_{qp}^L(t)} \delta(\tau - \tau_{qp}^L(t))$$

$$h_{qp,f_c}^{NLos}(t, \tau) = \sum_{n=1}^{N_{qp}(t)} \sum_{m=1}^{M_n(t)} \begin{bmatrix} F_{q,f_c,V}(\phi_{E,m_n}^R(t), \phi_{A,m_n}^R(t)) \\ F_{q,f_c,H}(\phi_{E,m_n}^R(t), \phi_{A,m_n}^R(t)) \end{bmatrix}^T \begin{bmatrix} e^{j\theta_{m_n}^{VV}} & \sqrt{\mu \kappa_{m_n}^{-1}(t)} e^{j\theta_{m_n}^{VH}} \\ \sqrt{\kappa_{m_n}^{-1}(t)} e^{j\theta_{m_n}^{HV}} & \sqrt{\mu} e^{j\theta_{m_n}^{HH}} \end{bmatrix}$$

$$F_r \begin{bmatrix} F_{p,f_c,V}(\phi_{E,m_n}^T(t), \phi_{A,m_n}^T(t)) \\ F_{p,f_c,H}(\phi_{E,m_n}^T(t), \phi_{A,m_n}^T(t)) \end{bmatrix} \sqrt{P_{qp,m_n,f_c}(t)} e^{j2\pi f_c \tau_{qp,m_n}(t)} \delta(\tau - \tau_{qp,m_n}(t)),$$

where $\{*\}^T$ denotes a transposition operation, $f_c$ denotes a carrier frequency, and denote antenna patterns of the array element $A_p^T$, for vertica larizations at different frequency bands, $F_{q,f_c,v}$ and $F_{q,f_c,H}$ denote antenna patterns of the array element $A_q^R$ for vertical and horizontal polarizations at different frequency bands, $\phi_{E,m_n}^R(t)$ denotes an elevation arrival angle corresponding to a m-th sub-path from a 1st array element of the receiver antenna array to a last-bounce cluster of a n-th path proximity to a receiver side at the time instant t, $\phi_{A,m_n}^{R}(t)$ denote an azimuth arrival angle corresponding to the m-th sub-path from the 1st array element of the receiver antenna array to the last-bounce cluster of the n-th path proximity to the receiver side at the time instant t, $\phi_{E,m_n}^{T}(t)$ denotes an elevation departure angle corresponding to the m-th sub-path from a 1st array element of the transmitter antenna array to a first-bounce cluster of the n-th path proximity to a transmitter side at the time instant t, $\phi_{A,mn}^{T}(t)$ denotes an azimuth arrival angle corresponding to the m-th sub-path from the 1st array element of the transmitter antenna array to the first-bounce cluster of the n-th path proximity to the transmitter side at the time instant t, $\kappa_{m_n}(t)$ denotes a cross polarization power ratio, $\mu$ denotes a co-polar imbalance, $\phi_{A,L}^{T}(t)$ and $\phi_{E,L}^{T}(t)$ denote an azimuth departure angle and an elevation departure angle corresponding to an LOS path from $A_1^T$ to $A_1^R$ at the time instant t, $\phi_{A,L}^{R}(t)$ and $\phi_{E,L}^{R}(t)$ denote an azimuth arrival angle and an elevation arrival angle corresponding to the LoS path from $A_1^T$ to $A_1^R$ at the time instant t, $\theta_L^{VV}$, $\theta_L^{HH}$, $\theta_{m_n}^{VV}$, $\theta_{m_n}^{VH}$, $\theta_{m_n}^{HV}$ and $\theta_{m_n}^{HH}$ are random phases uniformly distributed over (0, 2π], $$F_r = \begin{pmatrix} \cos\psi_{l,m} & -\sin\psi_{l,m} \\ \sin\psi_{l,m} & \cos\psi_{l,m} \end{pmatrix}, \psi_{l,m} = 108/f_c^2$$

denotes a Faraday rotation angle, a unit of $f_c$ in which the Faraday rotation angle is calculated herein GHz, $P_{qp,m_n f_c}(t)$ denotes a power of an m-th sub-path in a n-th path from $A_1^T$ to $A_1^R$ at a NLoS condition, $\tau_{qp}^{L}(t)$ denotes a delay of the LoS path at the time instant t, $$\tau_{qp}^{L}(t) = \frac{\vec{d}_{qp}(t)}{c},$$

$\vec{d}_{qp}(t)$ denotes a vector distance between the transmitter antenna array $A_p^T$ and the receiver antenna array $A_q^R$ at the time instant t, c denotes a speed of light, $\tau_{qp,m_n}(t)$ denotes a delay of the m-th sub-path in the n-th path from $A_1^T$ to $A_1^R$ at the time instant t, $P_{qp,m_n f_c}(t)$ denotes a power of the m-th sub-path in the n-th path from $A_1^T$ to $A_1^R$ at the time instant t, δ denotes Dirac function, and τ denotes a time delay, all of above parameters are time-varying parameters, further, steps for generating the channel matrix H are specifically as follows:

S1, setting propagation scenarios and propagation conditions for the transceiver, and determining a carrier frequency, an antenna array type, a layout of the transceiver and a motion trajectory of the transceiver;

S2, generating, according to standard channel models, the path loss, the shadowing, an oxygen absorption, and blockage effect loss;

S3, generating, according to positions and motion conditions of the transceiver, large-scale parameters with spatial consistency for a delay spread (DS) and 4 angle spreads, wherein the large-scale parameters includes SH, the DS, an azimuth spread of arrival (ASA), an azimuth spread of departure (ASD), an elevation spread of arrival (ESA), an elevation spread of departure (ESD), a Rice factor (KR) and a cross-polarization ratio (XPR);

S4, generating scatterers following an ellipsoid Gaussian scattering distribution, calculating, according to geographical location information of the transceiver and the scatterers, delays, angles and powers of clusters, and generating channel coefficients; and S5, updating, according to movements of the transceiver and birth-death processes of the clusters, the large-scale parameters and the small-scale parameters; and generating new channel coefficients, wherein a transmitter communicates with a receiver according to the generated channel matrix.

2. The method according to claim 1, wherein in Step S3, the DS is represented as a following formula:

$$DS_{f_c}(P) = DS_{\mu,f_c} + X^{DS}(P) \cdot DS_{\sigma,f_c},$$

where, $P=(P^T, P^R)$ is composed of transceiver position vectors, $P^T(t)=(x^T(t), y^T(t), z^T(t))$ and $P^R(t)=(x^R(t), y^R(t), z^R(t))$ denote a coordinate vector at a transmitter side of the transceiver and a coordinate vector at a receiver side of the transceiver at the time instant t, respectively, and initial values of which are generated according to simulation environments and requirements; $DS_{f_c}(P)$ denotes a value of DS corresponding to P in the frequency $f_c$; $X^{DS}(P)$ denotes a normal distribution variable generated by a sine wave superposition method and following a spatial consistency with a mean value of 0 and a variance of 1, $DS_{\mu,f_c}$ denotes a mean value for DS in a frequency $f_c$, and $DS_{\sigma,f_c}$ denotes a variance of DS in the frequency $f_c$, configuration values for $DS_{\sigma,f_c}$ are divided into three types according to a height $h_{UT}$ of the transceiver; for terrestrial mobile communication scenarios 1.5 m≤$h_{UT}$≤22.5 m, $\log_{10}(DS_{\mu,f_c}/1$ s) is equal to $-6.28-0.204 \log_{10} f_c$; for UAV scenarios 22.5 m≤$h_{UT}$≤300 m, $\log_{10}(DS_{\mu,f_c}/1$ s) is equal to $0.0965 \log_{10} h_{UT}-7.503$; for satellite communication scenarios, $\log_{10}(DS_{\mu,f_c}/1$ s) is equal to $-7.21$; in NLoS conditions of urban macro scenarios, when a carrier frequency ranges from 2 to 4 GHZ, $DS_{\mu,f_c}$ is calculated as follows:

$$\log_{10}(DS_{\mu,f_c}/1 \text{ s}) = \begin{cases} -0.204 \log_{10}(f_c) - 6.28, & 1.5 \text{ m} < h_{UT} \leq 22.5 \text{ m}, NLoS \\ 0.0965 \log_{10}(h_{UT}) - 7.503, & 22.5 \text{ m} < h_{UT} \leq 300 \text{ m}, NLoS \\ -7.21 & (\text{An elevation angle of the link is } 10°) \end{cases}$$

generation processes of other large-scale parameters are the same as a generation process of the DS, values for the large-scale parameters with spatial consistency in a logarithm domain are obtained by multiplying a cross-correlation matrix among the large-scale parameters, after 8 large-scale parameters are generated, subsequently values in the logarithm domain are converted into a linear domain; so that the large-scale parameters of the channel are obtained.

3. The method according to claim 1, wherein Step S4 is specifically as follows:

S401, obtaining, by using an ellipsoid Gaussian scattering distribution, positions of the scatterers, wherein the scatterers in a n-th cluster centered on ($\bar{d}_n^X$, $\bar{\phi}_{E,n}^X$, $\bar{\phi}_{A,n}^X$) follow a Gaussian distribution with standard deviations of $\sigma_x^X$, $\sigma_y^X$ and $\sigma_z^X$ on three axes respectively, where ($\bar{d}_n^X$, $\bar{\phi}_{E,n}^X$, $\bar{\phi}_{A,n}^X$) denotes a position of the n-th cluster center point at the transmitter side or the receiver side in a spherical coordinate system, $\bar{d}_n^X$ denotes a distance between the n-th cluster center to $A_1^T$ or $A_1^R$, $\bar{\phi}_{E,n}^X$ denotes an elevation angle of the n-th cluster at the transmitter side or the receiver side measured from Z-axis, $\bar{\phi}_{A,n}^X$ denotes an azimuth angle of the n-th cluster at the transmitter side or the receiver side measured from X-axis in X-Y plane, $\sigma_x^X$ denotes a standard deviation at the transmitter side or the receiver side on X-axis, $\sigma_x^Y$ denotes a standard deviation at the transmitter side or the receiver side on Y-axis, $\sigma_x^Z$ denotes a standard deviation at the transmitter side or the receiver side on Z-axis; converting, after obtaining the positions of the scatterers, the positions of the scatterers into spherical coordinates; positions $\vec{C}_{m_n}^A(t_0)$ and $\vec{C}_{m_n}^Z(t_0)$ of the scatterers in the n-th cluster corresponding to a position of a first transmitter antenna $\vec{A}_1^T(t_0)$ and a position of a first receiver antenna $\vec{A}_1^R(t_0)$ are represented as $\vec{C}_{m_n}^A(t_0)=(d_{m_n}^T(t_0),\phi_{A,m_n}^T(t_0),\phi_{E,m_n}^T(t_0))$ and $\vec{C}_{m_n}^Z(t_0)=(d_{m_n}^R(t_0),\phi_{A,m_n}^R(t_0),\phi_{E,m_n}^R(t_0))$, where $d_{m_n}^X(t_0)$, $\phi_{A,m_n}^X(t_0)$ and $\phi_{E,m_n}^X(t_0)$ denote a distance, an azimuth angle, and an elevation angle of m-th sub-path of n-th cluster at the transmitter side or the receiver side, respectively, $X \in \{T, R\}$ denotes the transmitter side and the receiver side, $\vec{C}_{m_n}^A(t_0)$ denotes a position of the m-th scatterer in $C_n^A$ at a time instant $t_0$, $\vec{C}_{m_n}^Z(t_0)$ denotes a position of the m-th scatterer in $C_n^Z$ at the time instant $t_0$, and $P'_{qp,m_n,f_c}(t)$ denotes a non-normalized sub-paths power of the m-th sub-path in the n-th path from the p-th array element $A_p^T$ at the transmitter side to the q-th array element $A_q^R$ at the receiver side at the time instant t and carrier frequency $f_c$;

S402, calculating, in a multi-bounce channel model, delays of sub-paths in the cluster at an initial time instant by $$\tau_{qp,m_n}(t_0) = \frac{\left(d_{p,m_n}^T(t_0) + d_{q,m_n}^R(t_0)\right)}{c} + \tilde{\tau}_{m_n}(t_0),$$

where $\tilde{\tau}_{m_n}$ denotes a delay of virtual links between $\vec{C}_{m_n}^A$ and $\vec{C}_{m_n}^Z$, $d_{p,m_n}^T(t_0)$ denotes a distance between $A_p^T$ and $C_{m_n}^A$ at the time instant $t_0$, and $d_{q,m_n}^R(t_0)$ denotes a distance between $A_q^R$ and $C_{m_n}^Z$ at the time instant $t_0$, $$\tilde{\tau}_{m_n}(t_0) = \frac{\tilde{d}_{m_n}(t_0)}{c} + \tau_{link}(t_0), \tilde{d}_{m_n}(t_0)$$

denotes a distance between the first-bounce cluster and the last-bounce cluster, $\tau_{link}$ denotes a non-negative variable following an exponential distribution;

S403, varying, in a (ultra-) massive MIMO scenario, a sub-paths power $P_{qp,m_n,f_c}(t)$ in the clusters along a time axis and an array axis, and commonly modeling the sub-paths power as a lognormal process varying with time and a lognormal process varying with the array, wherein a non-normalized sub-paths power $P'_{qp,m_n,f_c}(t)$ in the clusters is:

$$P'_{qp,m_n,f_c}(t) = \underbrace{\exp\left(-\tau_{qp,m_n}(t)\frac{r_\tau - 1}{r_\tau DS}\right)10^{-\frac{Z_n}{10}}}_{A\ time\ domain} \cdot \underbrace{\xi_n(p,q)}_{A\ space\ domain},$$

where $Z_n$ denotes a per cluster shadowing term in dB, $r_\tau$ denotes a delay distribution proportionality factor, $\xi_n(p,q)$ denotes a two-dimensional spatial lognormal process for simulating smooth power variations over antenna arrays;

in wide bandwidth scenarios, multiplying, by taking frequency domain non-stationary characteristics into account, a power value by $$\left(\frac{f}{f_c}\right)^{\gamma_{m_n}}$$

in a frequency domain, where $\gamma_{m_n}$ is a frequency-dependent constant factor; eventually, obtaining, by normalizing the powers of all clusters, an ultimate power $P_{qp,m_n,f_c}(t)$ of the sub-paths in the clusters; substituting, if the clusters are newly generated, $\tau_{qp,m_n}(t)$ with $\tau_{qp,m_n}(t_0)$ to obtain an initial power of the m-th sub-path in the n-th cluster between $A_p^T$ and $A_q^R$;

S404, updating, for the survived clusters, small-scale parameters such as the powers and the delays of the sub-paths in the clusters at different time instants, wherein for a trajectory segment at the time instant $t_1$, that is, at a subsequent time instant after the clusters are generated, a coordinate of the p-th array element $A_p^T$ is:

$$\vec{A}_p^T(t_1) = \vec{A}_p^T(t_0) + v^T(t_1 - t_0) \cdot \begin{bmatrix} \cos\alpha_A^T \cdot \cos\alpha_E^T \\ \sin\alpha_A^T \cdot \cos\alpha_E^T \\ \sin\alpha_E^T \end{bmatrix}^T,$$

calculating a coordinate $\vec{A}_p^T(t_0)$ of the p-th array element at the initial time instant by $$\vec{A}_p^T(t_0) = \vec{A}_1^T(t_0) + (p-1) \cdot \delta_T \cdot \begin{bmatrix} \cos\beta_A^T \cdot \cos\beta_E^T \\ \sin\beta_A^T \cdot \cos\beta_E^T \\ \sin\beta_E^T \end{bmatrix}^T,$$

calculating a coordinate $\vec{C}_{m_n}^A(t_1)$ of an m-th scatterer in a n-th first-bounce cluster by $$\vec{C}_{m_n}^A(t_1) = \vec{C}_{m_n}^A(t_0) + v^{A_n}(t_1 - t_0) \cdot \begin{bmatrix} \cos\alpha_A^{A_n} \cdot \cos\alpha_E^{A_n} \\ \sin\alpha_A^{A_n} \cdot \cos\alpha_E^{A_n} \\ \sin\alpha_E^{A_n} \end{bmatrix}^T,$$

at the time instant $t_1$; obtaining a distance from $A_p^T$ to $C_{m_n}^A$ by calculating $d_{p,m_n}^T(t_1) = \|\vec{C}_{m_n}^A(t_1) - \vec{A}_p^T(t_1)\|$ at the time instant $t_1$, similarly, obtaining a distance $d_{q,m_n}^R(t_1)$ from $A_q^R$ to $C_{m_n}^Z$; a delay of the sub-path in the clusters at the time instant $t_1$ being $\tau_{qp,m_n}(t_1) = (d_{p,m_n}^T(t_1) + d_{q,m_n}^R(t_1))/c + \tilde{\tau}_{m_n}$; obtaining $\tau_{qp,m_n}(t)$ and $P_{qp,m_n}(t)$ by using geographical locations of the transmitter, the receiver, and the scatterer at a previous time instant, $(t=t_2, t_3, \ldots)$.

4. The method according to claim 1, wherein in Step S5, a space-time-frequency non-stationarity of the model is reflected in parameters for space-time-frequency variations, and birth-death processes of the clusters in a space-time-frequency domain, and a number of the clusters at the time instant t is calculated as follows:

$$N_{qp}(t) = N_{surv}(t) + N_{new}(t),$$

where $N_q^p(t)$ denotes a number of the clusters, $N_{surv}(t)$ denotes a number of survived clusters determined by a survival probability $P_{surv}(\Delta t, \Delta r, \Delta f)$ of the clusters, $N_{new}(t)$ denotes a number of newly generated clusters following a Poisson distribution with a mean value $E[N_{new}(t)]$, $\lambda G$ is defined as a birth rate of the clusters, $\lambda_R$ is defined as a combination rate of the clusters, that is, a death rate.

5. The method according to claim 4, wherein in Step S5, in order to model a space-time-frequency evolution process of the clusters more accurately, two types of sampling intervals are introduced, one type is a time domain sampling interval $\Delta t$, a frequency domain sampling interval $\Delta f$ and a space domain sampling interval $\Delta r$, and channel parameters are updated continuously, another type is described by $\Delta t_{BD}$, $\Delta f_{BD}$ and $\Delta r_{BD}$ that are integer multiples of corresponding $\Delta t$, $\Delta f$ and $\Delta r$, and during the birth-death processes and the evolution processes of the clusters occurred at sampling points, survival probabilities of the transmitter side and receiver side clusters along the array axis and time axis are as follows:

$$P_{surv}^T(\Delta t_{BD}, \delta_p) = e^{-\lambda_R \left((\epsilon_1^T)^2 + (\epsilon_2^T)^2 - 2\epsilon_1^T\epsilon_2^T \cos(\alpha_A^T - \beta_A^T)\right)^{1/2}}$$

$$P_{surv}^R(\Delta t_{BD}, \delta_q) = e^{-\lambda_R \left((\epsilon_1^R)^2 + (\epsilon_2^R)^2 + 2\epsilon_1^R\epsilon_2^R \cos(\alpha_A^R - \beta_A^R)\right)^{1/2}}$$

where, $\epsilon_1^T = \frac{\delta_p \cos\beta_E^T}{D_c^A} \left(\epsilon_1^R = \frac{\delta_q \cos\beta_E^R}{D_c^A}\right)$ and $\epsilon_2^T = \frac{v^T \Delta t_{BD}}{D_c^S} \left(\epsilon_2^R = \frac{v^R \Delta t_{BD}}{D_c^S}\right)$ denote position differences of a transmitter antenna element and a receiver antenna element on the array axis and the time axis, respectively, $D_c^A$ and $D_c^S$ denote scenario-dependent factors on the array axis and the time axis, respectively, e denotes a natural constant, $\lambda_R$ denotes the combination rate of a cluster, $\epsilon_1^T$ denotes a position difference of a transmitter antenna element on the array axis, $\epsilon_2^T$ denotes a position difference of a transmitter antenna element on the time axis, $\alpha_A^T$ denotes a moving azimuth angle of the transmitter antenna array $A^T$ in the X-Y plane, $\beta_A^T$ denotes an azimuth angle of the transmitter antenna array $A^T$ in the X-Y plane, $\epsilon_1^R$ denotes a position difference of a receiver antenna element on the array axis, $\epsilon_2^R$ denotes a position difference of a receiver antenna element on the time axis, $\alpha_A^R$ denotes a moving azimuth angle of the receiver antenna array in the X-Y plane, and $\beta_A^T$ denotes an azimuth angle of the receiver antenna array in the X-Y plane, a joint survival probability of the transmitter side and receiver side clusters is represented as follows:

$$P_{surv}(\Delta t_{BD}, \delta_p, \delta_q) = P_{surv}^T(\Delta t_{BD}, \delta_p) P_{surv}^R(\Delta t_{BD}, \delta_q),$$

an average number of the newly generated clusters is:

$$E(N_{new}) = \frac{\lambda_G}{\lambda_R}(1 - P_{surv}(\Delta t_{BD}, \Delta r_{BD})),$$

where $E(N_{new})$ denotes an average number of the newly generated cluster, $\lambda_G$ denotes the birth rate of the cluster, $\lambda_R$ denotes the combination rate of the cluster, $\Delta t$ denotes the time domain sampling interval, $\Delta t_{BD}$ denotes an integer multiple of $\Delta t$, $\Delta r$ denotes the space domain sampling interval, $\Delta r_{BD}$ denotes an integer multiple of $\Delta r$, $\Delta f$ denotes the frequency domain sampling interval, $\Delta f_{BD}$ denotes an integer multiple of $\Delta f$, and $P_{surv}(\Delta t_{BD}, \Delta r_{BD})$ denotes a survived probability of clusters in a space-time domain, when wide bandwidth scenarios are studied, the birth-death processes of the clusters also exist on a frequency axis, and a survival probability of the clusters on the frequency axis is:

$$P_{surv}(\Delta f_{BD}) = e^{-\lambda_R \frac{F(\Delta f_{BD})}{D_c^f}},$$

where $F(\Delta f_{BD})$ and $D_c^f$ are determined by channel measurements, $D_c^f$ denotes a scenario-dependent factor on the frequency axis, in summary, when the birth-death processes of the space-time-frequency domain clusters are taken into account, the survival probability of the clusters is:

$$P_{surv}(\Delta t_{BD}, \Delta r_{BD}, \Delta f_{BD}) = P_{surv}^T(\Delta t_{BD}, \delta_p) P_{surv}^R(\Delta t_{BD}, \delta_q) P_{surv}(\Delta f_{BD}),$$

where $P_{surv}(\Delta t_{BD}, \Delta r_{BD}, \Delta f_{BD})$ denotes a survived probability of clusters in the space-time-frequency domain; $P_{surv}^T(\Delta t_{BD}, \delta_p)$ denotes a survived probability of the cluster at the transmitter side along the array axis and time axis; $P_{surv}^R(\Delta t_{BD}, \delta_q)$ denotes a survived probability of the cluster at the receiver side along the array axis and time axis; and $P_{surv}(\Delta f_{BD})$ denotes a survived probability of the cluster in the frequency domain, the average number of the newly generated clusters is:

$$E(N_{new}) = \frac{\lambda_G}{\lambda_R}(1 - P_{surv}(\Delta t_{BD}, \Delta r_{BD}, \Delta f_{BD})),$$

in ultra-high speed train (UHST) scenarios, by taking account of a waveguide effect and an impact of tube wall roughness on channels in vacuum tube UHST scenarios, the average number of the newly generated clusters is:

$$E(N_{new}) = \frac{\lambda_G}{\lambda_R}(1 - P_{surv}(\Delta t_{BD}, \Delta r_{BD}, \Delta f_{BD}))\left(1 - \frac{D_{qp}(t)}{D}\right) \cdot \frac{\rho_s}{\rho_{s_0}}$$

$$\rho_s = e^{\left(-8\left(\frac{\pi\sigma_h \cos\left(E\left[\phi_{E,m_n}^T\right]\right)}{\lambda}\right)^2\right)},$$

where $D_{qp}(t)$ denotes a linear distance between the transmitter side and the receiver side at the time instant t, D denotes an initial distance between the transmitter side and the receiver side, $\rho_s$ denotes a scattering coefficient of the tube wall, and $\rho_{s_0}$ denotes a scattering coefficient with a roughness of $\sigma_h = 0$.

6. The method according to claim 1, wherein when the method for pervasively modeling 6G channels is utilized in maritime communication scenarios, three parts of a LOS path component and multipath components of both a rough ocean surface and an evaporation duct over a sea surface are modeled as $h_{qp,f_c}^{LoS}(t, \tau)$, $h_{qp,f_c}^{NLoS_1}(t, \tau)$ and $h_{qp,f_c}^{NLoS_2}(t, \tau)$ by the model, and power control factors $S_1$ and $S_1$ are used to manipulate a disappearance and an appearance of corresponding parts with variations of distances between two ships, that is, a NLoS part of a formula for calculating $h_{qp,f_c}^{NLoS}(t, \tau)$ is divided into two parts: $h_{qp,f_c}^{NLoS_1}(t, \tau)$ and $h_{qp,f_c}^{NLoS_2}(t, \tau)$, and $S_1+S_2=1$; in IIoT scenarios, specular multipath components and dense multipath components are modeled as $h_{qp,f_c}^{NLoS_{SC}}(t, \tau)$ and $h_{qp,f_c}^{NLoS_{DMC}}(t, \tau)$ respectively, and modeling methods for $h_{qp,f_c}^{NLoS_1}(t, \tau)$, $h_{qp,f_c}^{NLoS_2}(t, \tau)$, $h_{qp,f_c}^{NLoS_{SC}}(t, \tau)$ and $h_{qp,f_c}^{NLoS_{DMC}}(t, \tau)$ are the same as that for $h_{qp,f_c}^{NLoS_1}(t, \tau)$ merely with different parameter values and different distributions of clusters, $h_{qp,f_c}^{LoS}(t, \tau)$ denotes a channel impulse response (CIR) of the LoS component in maritime communication scenario; $h_{qp,f_c}^{NLoS_1}(t, \tau)$ denotes a CIR of the NLoS component introduced by rough ocean surface scattering; $h_{qp,f_c}^{NLoS_2}(t, \tau)$ denotes a CIR of the NLoS component introduced by scattering from evaporation duct over a sea surface; $h_{qp,f_c}^{NLoS}(t, \tau)$ denotes a CIR of the NLoS component, which is divided into two parts: $h_{qp,f_c}^{NLoS_1}(t, \tau)$ and $h_{qp,f_c}^{NLoS_2}(t, \tau)$, where $h_{qp,f_c}^{NLoS_{SC}}(t, \tau)$ denotes a CIR of the NLoS component introduced by specular component (SC) in industrial internet of things (IIOT) scenario; and $h_{qp,f_c}^{NLoS_{DMC}}(t, \tau)$ denotes a CIR of the NLoS component introduced by dense multipath component (DMC) in IIoT scenario.

7. The method according to claim 1, wherein when the method for pervasively modeling 6G channels is utilized in RIS scenarios, channels are divided into a sub-channel $H_{TI}$ from the transmitter side to the RIS, a sub-channel $H_{IR}$ from the RIS to the receiver side and a sub-channel $H_{TR}$ from the transmitter side to the receiver side, the three sub-channels are modeled respectively and a phase shift diagonal matrix $\phi$ is introduced to implement an intelligent control for channel environments, calculation methods of $H_{IR}$, $H_{TI}$ and $H_{TR}$ are the same as that of $H_s$ merely with different parameter values and different distributions of clusters.

8. The method according to claim 1, wherein when the method for pervasively modeling 6G channels is utilized in modeling for VLC channels, on one hand, wavelengths of optical signals are extremely short, a size of the receiver is commonly multi-million wavelengths with no rapid signal fading on multi-wavelengths; on another hand, due to an incoherent light emitted by an LED light in a VLC communication system, the optical signals has no phase information, and no rapid signal fading is caused after a superposition of real-valued multipath signals at the receiver side with an exhibition on a slow-varying shadowing, therefore, although a current VLC model representation is a channel impulse response form of a multipath superposition, the representation is essentially a large-scale model of modeling PL and SH, that is, $H_s=1$, $PL \cdot SH = h_{p_V p_H}^{LoS}(t, \tau) + h_{p_V p_H_N}^{LoS}(t, \tau) = P_{p_V p_H}^{LoS}(t) \cdot \delta(\tau - \tau_{p_V p_H}^{LoS}(t)) + P_{p_V p_H, m_n}^{NLoS}(t) \cdot \delta(\tau - \tau_{p_V p_H, m_n}(t))$, $p_H$, $p_V$ respectively denote a number of rows and a number of columns in an LED array, where PL denotes the path loss; SH denotes the shadowing; $h_{p_V p_H}^{LoS}(t, \tau)$ denotes a CIR of LoS component on a visible light frequency band with a $p_H$-row_and_$p_V$-column_LED array; $h_{p_V p_H}^{NLoS}(t, \tau)$ denotes a CIR of NLoS component on the visible light frequency band; $P_{p_V p_H}^{LoS}(t)$ denotes a power on the visible light frequency band at a LOS condition; $\delta$ denotes the Dirac function; $\tau$ denotes the time delay; $T_{p_V p_H}^{LoS}(t)$ denotes a delay of the LoS path at the time instant t on the visible light frequency band; $P_{p_V p_H, m_n}^{NLoS}(t)$ denotes a power of an m-th sub-path in a n-th path from $A_1^T$ to $A_1^R$ on the visible frequency band at a NLoS condition; and $\tau_{p_V p_H, m_n}(t)$ denotes a delay of the m-th sub-path in the n-th path from $A_1^T$ to $A_1^R$ at the time instant t on the visible light frequency band.

9. The method according to claim 1, wherein when the method for pervasively modeling 6G channels is utilized in multi-link scenarios:
assuming that a number of base stations is $N_{BS}$ and a number of users is $N_{MS}$, a channel transmission matrix of a multi-link channel model is represented as a following formula:

$$H_M = \begin{bmatrix} H_{BS_1 MS_1} & \cdots & H_{BS_1 MS_{N_{MS}}} \\ \vdots & \ddots & \vdots \\ H_{BS_{N_{BS}} MS_1} & \cdots & H_{BS_{N_{BS}} MS_{N_{MS}}} \end{bmatrix}_{N_{BS} \times N_{MS}},$$

$$H_{BS_i MS_j}, i = 1, 2 \ldots N_{BS}, j = 1, 2 \ldots N_{MS}$$

corresponding to each link is a single-link channel model H described above, where $H_M$ denotes a channel matrix of a multi-link channel model; $H_{BS_1 MS_1}$ denotes a channel matrix of the single-link channel from a first base station to a first user; $H_{BS_{N_{BS}} MS_1}$ denotes a channel matrix of the single-link channel from a $N_{BS}$-th base station to the first user; $H_{BS_1 MS_{N_{MS}}}$ denotes a channel matrix of the single-link channel from the first base station to a $N_{MS}$-th user; and $H_{BS_{N_{BS}} MS_{N_{MS}}}$ denotes a channel matrix of the single-link channel from the $N_{BS}$-th base station to the $N_{MS}$-th user.

\* \* \* \* \*

UNITED STATES PATENT AND TRADEMARK OFFICE
CERTIFICATE OF CORRECTION

Page 1 of 1

PATENT NO. : 12,451,984 B2
APPLICATION NO. : 18/696233
DATED : October 21, 2025
INVENTOR(S) : Chengxiang Wang et al.

It is certified that error appears in the above-identified patent and that said Letters Patent is hereby corrected as shown below:

On the Title Page

Add Item (30) after Item (22):
(30) Foreign Application Priority Data: Mar. 10, 2022 (CN) ...202210235058.9

Signed and Sealed this
Thirteenth Day of January, 2026

John A. Squires
*Director of the United States Patent and Trademark Office*